(12) United States Patent
He et al.

(10) Patent No.: US 10,368,228 B2
(45) Date of Patent: Jul. 30, 2019

(54) TERMINAL DISCOVERY METHOD AND DEVICE

(71) Applicant: Huawei Technologies Co., Ltd., Shenzhen (CN)

(72) Inventors: Yue He, Beijing (CN); Hui Jin, Beijing (CN); Guowei Ouyang, Beijing (CN); Qiang Yi, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 15/663,018

(22) Filed: Jul. 28, 2017

(65) Prior Publication Data
US 2017/0347256 A1    Nov. 30, 2017

Related U.S. Application Data

(63) Continuation of application No. PCT/CN2015/072043, filed on Jan. 30, 2015.

(51) Int. Cl.
| | |
|---|---|
| *H04W 4/00* | (2018.01) |
| *H04W 8/00* | (2009.01) |
| *H04W 48/16* | (2009.01) |
| *H04W 4/06* | (2009.01) |
| *H04W 72/04* | (2009.01) |
| *H04L 29/06* | (2006.01) |
| *H04W 84/04* | (2009.01) |

(Continued)

(52) U.S. Cl.
CPC ............ *H04W 8/005* (2013.01); *H04W 4/06* (2013.01); *H04W 48/16* (2013.01); *H04W 72/0466* (2013.01); *H04L 65/1063* (2013.01); *H04W 84/042* (2013.01); *H04W 88/02* (2013.01); *H04W 92/18* (2013.01)

(58) Field of Classification Search
CPC .... H04L 65/1063; H04W 4/06; H04W 8/005; H04W 48/16; H04W 72/04; H04W 72/0466; H04W 84/04; H04W 84/042; H04W 88/02; H04W 92/18
See application file for complete search history.

(56) References Cited

U.S. PATENT DOCUMENTS

| | | | | |
|---|---|---|---|---|
| 9,432,833 | B2 * | 8/2016 | Kim ...................... | H04W 48/16 |
| 9,955,409 | B2 * | 4/2018 | Baek ..................... | H04W 48/16 |

(Continued)

FOREIGN PATENT DOCUMENTS

| | | |
|---|---|---|
| CN | 104012012 A | 8/2014 |
| CN | 104185301 A | 12/2014 |

(Continued)

OTHER PUBLICATIONS

3GPP TSG SA WG2 Meeting #99, Network Triggered ProSe Direct Discovery, 5 pages, Sep. 2013.*

(Continued)

*Primary Examiner* — Frank Duong
(74) *Attorney, Agent, or Firm* — Leydig, Voit & Mayer, Ltd.

(57) ABSTRACT

Embodiments of the present disclosure disclose a terminal discovery method and a device, and relate to the field of communications technologies, to resolve a problem that a process of filtering a user code word is relatively complex when a terminal needs to monitor multiple terminals.

6 Claims, 17 Drawing Sheets

(51) Int. Cl.
 *H04W 88/02* (2009.01)
 *H04W 92/18* (2009.01)

(56) References Cited

U.S. PATENT DOCUMENTS

| | | | |
|---|---|---|---|
| 2011/0258257 A1* | 10/2011 | Previdi | H04L 45/126 709/205 |
| 2013/0086260 A1 | 4/2013 | Biazetti et al. | |
| 2014/0148201 A1 | 5/2014 | Kuo | |
| 2016/0286354 A1 | 9/2016 | Kim et al. | |
| 2016/0309401 A1 | 10/2016 | Baek et al. | |

FOREIGN PATENT DOCUMENTS

| | | |
|---|---|---|
| WO | 2014071140 A2 | 5/2014 |
| WO | 2014158006 A1 | 10/2014 |

OTHER PUBLICATIONS

"3rd Generation Partnership Project; Technical Specification Group Services and System Aspects; Proximity-based services (ProSe); Stage 2 (Release 12)," 3GPP TS 23.303 V12.0.0, 3rd Generation Partnership Project, Valbonne, France (Feb. 2014).
"3rd Generation Partnership Project; Technical Specification Group Services and System Aspects; Study on architecture enhancements to support Proximity-based Services (ProSe) (Release 12)," 3GPP TR 23.703 V12.0.0, 3rd Generation Partnership Project, Valbonne, France (Feb. 2014).
"Examples of Application Driven Discovery," SA WG2 Meeting #106, San Francisco, California, USA, S2-144227, 3rd Generation Partnership Project, Valbonne, France (Nov. 17-21, 2014).
"3rd Generation Partnership Project; Technical Specification Group Services and System Aspects;Proximity-based services (ProSe); Stage 2 (Release 12)," 3GPP TS 23.303 V12.3.0, pp. 1-62, 3rd Generation Partnership Project, Valbonne, France (Dec. 2014).
Liebhart et al., "Proximity Services," LTE for public safety, XP055238717, John Wiley & Sons, UK, (2015).
"Support for partial matching in Model A restricted discovery," SA WG2 Meeting #106, San Francisco, USA, S2-144129, 3rd Generation Partnership Project, Valbonne, France (Nov. 17-21, 2014).
"Addition of Service Group Identifier," 3GPP TSG-CT WG1 Meeting #90 Sorrento (Italy), C1-150394, 3rd Generation Partnership Project, Valbonne, France (Feb. 2-6, 2015).
"Restricted Direct Discovery in always announcement," 3GPP TSG SA WG2 Meeting #104, Dublin, Ireland, S2-142499, 3rd Generation Partnership Project, Valbonne, France (Jul. 7-11, 2014).
"Discussion on Identities Usage on Restricted Direct Discovery," 3GPP TSG SA WG2 Meeting #104, Dublin, Ireland, S2-142500, 3rd Generation Partnership Project, Valbonne, France (Jul. 7-11, 2014).

* cited by examiner

TERMINAL DISCOVERY METHOD AND DEVICE

CROSS-REFERENCE TO RELATED APPLICATIONS

This application is a continuation of International Application No. PCT/CN2015/072043, filed on Jan. 30, 2015, the disclosure of which is hereby incorporated by reference in its entirety.

TECHNICAL FIELD

The present disclosure relates to the field of communications technologies, and in particular, to a terminal discovery method and a device.

BACKGROUND

In a conventional mobile network, a data communication path between terminals needs to go through a core network entity serving gateway (SGW)/packet data gateway (PGW). In this case, data transmission also needs to go through a core network when being performed by two terminals that are quite close to each other, and data transmission efficiency is low.

To resolve this problem, a proximity service (ProSe) topic is proposed in the industry, so that data transmission can be directly performed by the two terminals that are relatively close to each other without going through the core network, and efficiency of data transmission between terminals that are relatively close to each other can be improved. That the terminals discover each other is an important part of a ProSe, and is also a premise of the data transmission between the terminals.

It is assumed that a terminal 1 and a terminal 2 are two terminals that are quite close to each other, the terminal 1 performs broadcasting, and the terminal 2 performs monitoring. In the prior art, a process of discovering the terminal 1 by the terminal 2 may include: the terminal 1 obtains a user code word of the terminal 1 and broadcasts the user code word; the terminal 2 first obtains the user code word of the terminal 1, and then filters, by using the user code word, the user code word of the terminal 1 from all user code words detected by the terminal 2; the terminal 2 sends the filtered user code word of the terminal 1 to a ProSe entity; and the ProSe entity searches for a correspondence between a user code word and a terminal identifier according to the received user code word of the terminal 1, obtains a terminal identifier of the terminal 1, and sends the obtained terminal identifier of the terminal 1 to the terminal 2. In this way, the terminal 2 can discover the terminal 1 according to an identifier of the terminal 1.

However, the foregoing process has the following problem: When the terminal 2 needs to monitor multiple terminals (for example, the terminal 2 needs to monitor 20 terminals), the terminal 2 may obtain user code words of the 20 terminals, and the terminal 2 needs to filter, by using 20 user code words separately, the 20 user code words that need to be monitored by the terminal 2 from all the user code words detected by the terminal 2. Generally, a quantity of user code words that can be detected by a terminal is relatively large (for example, the terminal 2 can detect 1000 user code words), that is, the terminal 2 needs to filter, by using the 20 user code words separately, the 20 user code words that need to be monitored by the terminal 2 from the 1000 user code words detected by the terminal 2. A process of filtering the user code word by the terminal 2 is relatively complex, and energy consumption of the terminal 2 is increased.

SUMMARY

Embodiments of the present disclosure provide a terminal discovery method and a device, to resolve a problem that a process of filtering a user code word is relatively complex when a terminal needs to monitor multiple terminals.

According to a first aspect of the embodiments of the present disclosure, a terminal discovery method is provided, including:

receiving, by a first proximity service (ProSe) entity, a first message sent by a first terminal, where the first message carries a group identifier of a group in which a terminal to be monitored by the first terminal is located;

obtaining, by the first ProSe entity according to the group identifier, a group code word of the group in which the terminal to be monitored by the first terminal is located;

sending, by the first ProSe entity, a second message to the first terminal, where the second message carries the group code word;

receiving, by the first ProSe entity, a third message sent by the first terminal, where the third message carries at least one first broadcast code word, the first broadcast code word is a broadcast code word that is of broadcast code words detected by the first terminal and that includes the group code word, and the first broadcast code word further includes a user code word of a terminal that broadcasts the first broadcast code word; and obtaining, by the first ProSe entity according to the user code word, a terminal identifier of the terminal that broadcasts the first broadcast code word, and sending a fourth message to the first terminal, where the fourth message carries the terminal identifier.

With reference to the first aspect, in a first possible implementation of the first aspect, the obtaining, by the first ProSe entity according to the group identifier, a group code word of the group in which the terminal to be monitored by the first terminal is located includes:

sending, by the first ProSe entity, a fifth message to an application server, where the fifth message carries the group identifier, and the fifth message is used to request the application server to allocate a code word to the group in which the terminal to be monitored by the first terminal is located; and receiving, by the first ProSe entity, a sixth message sent by the application server, where the sixth message carries the group code word.

With reference to the first aspect, in a second possible implementation of the first aspect, the obtaining, by the first ProSe entity according to the group identifier, a group code word of the group in which the terminal to be monitored by the first terminal is located includes:

generating, by the first ProSe entity, the group code word according to the group identifier.

With reference to the first aspect, in a third possible implementation of the first aspect, when the first terminal and a second terminal belong to different home public land mobile networks (HPLMN), and the second terminal is a group management device of the group in which the terminal to be monitored by the first terminal is located, the obtaining, by the first ProSe entity according to the group identifier, a group code word of the group in which the terminal to be monitored by the first terminal is located includes:

sending, by the first ProSe entity, a seventh message to a second ProSe entity, where the seventh message carries the group identifier, the seventh message is used to request the second ProSe entity to allocate a code word to the group in which the terminal to be monitored by the first terminal is located, and the second ProSe entity is a ProSe entity in an HPLMN of the second terminal; and receiving, by the first ProSe entity, an eighth message sent by the second ProSe entity, where the eighth message carries the group code word.

With reference to the first aspect and the foregoing possible implementations, in a fourth possible implementation of the first aspect, the group identifier is a temporary identifier allocated by the application server to the group in which the terminal to be monitored by the first terminal is located, and the terminal identifier is a temporary identifier allocated by the application server to the terminal that broadcasts the first broadcast code word.

According to a second aspect of the embodiments of the present disclosure, a terminal discovery method is provided, including:

sending, by a first terminal, a first message to a first ProSe entity, where the first message carries a group identifier of a group in which a terminal to be monitored by the first terminal is located;

receiving, by the first terminal, a second message sent by the first ProSe entity, where the second message carries a group code word of the group in which the terminal to be monitored by the first terminal is located;

filtering, by the first terminal by using the group code word, broadcast code words detected by the first terminal, to obtain at least one first broadcast code word, where the first broadcast code word includes the group code word;

sending, by the first terminal, a third message to the first ProSe entity, where the third message carries the at least one first broadcast code word; and receiving, by the first terminal, a fourth message sent by the first ProSe entity, where the fourth message carries a terminal identifier of a terminal that broadcasts the first broadcast code word.

With reference to the second aspect, in a first possible implementation of the second aspect, the group identifier is a temporary identifier allocated by an application server to the group in which the terminal to be monitored by the first terminal is located, and the terminal identifier is a temporary identifier allocated by the application server to the terminal that broadcasts the first broadcast code word.

According to a third aspect of the embodiments of the present disclosure, a terminal discovery method is provided, including:

receiving, by a third ProSe entity, a ninth message sent by a third terminal, where the ninth message carries a terminal identifier of the third terminal and a group identifier of a group in which the third terminal is located;

obtaining, by the third ProSe entity according to the group identifier, a group code word of the group in which the third terminal is located, and allocating a user code word to the third terminal according to the terminal identifier of the third terminal; generating, by the third ProSe entity, a first broadcast code word by using the group code word and the user code word; and sending, by the third ProSe entity, a tenth message to the third terminal, where the tenth message carries the first broadcast code word, and the tenth message is used to instruct the third terminal to broadcast the first broadcast code word.

With reference to the third aspect, in a first possible implementation of the third aspect, the obtaining, by the third ProSe entity according to the group identifier, a group code word of the group in which the third terminal is located includes:

sending, by the third ProSe entity, an eleventh message to an application server, where the eleventh message carries the group identifier, and the eleventh message is used to request the application server to allocate a code word to the group in which the third terminal is located; and receiving, by the third ProSe entity, a twelfth message sent by the application server, where the twelfth message carries the group code word.

With reference to the third aspect, in a second possible implementation of the third aspect, the obtaining, by the third ProSe entity according to the group identifier, a group code word of the group in which the third terminal is located includes:

generating, by the third ProSe entity, the group code word according to the group identifier.

With reference to the third aspect, in a third possible implementation of the third aspect, when the third terminal and a second terminal belong to different HPLMNs, and the second terminal is a group management device of the group in which the third terminal is located, the obtaining, by the third ProSe entity according to the group identifier, a group code word of the group in which the third terminal is located includes:

sending, by the third ProSe entity, a thirteenth message to a second ProSe entity, where the thirteenth message carries the group identifier, the thirteenth message is used to request the second ProSe entity to allocate a code word to the group in which the third terminal is located, and the second ProSe entity is a ProSe entity in an HPLMN of the second terminal; and receiving, by the third ProSe entity, a fourteenth message sent by the second ProSe entity, where the fourteenth message carries the group code word.

With reference to the third aspect and the foregoing possible implementations, in a fourth possible implementation of the third aspect, the group identifier is a temporary identifier allocated by the application server to the group in which the third terminal is located, and the terminal identifier of the third terminal is a temporary identifier allocated by the application server to the third terminal.

According to a fourth aspect of the embodiments of the present disclosure, a terminal discovery method is provided, including:

sending, by a third terminal, a ninth message to a third ProSe entity, where the ninth message carries a terminal identifier of the third terminal and a group identifier of a group in which the third terminal is located;

receiving, by the third terminal, a tenth message sent by the third ProSe entity, where the tenth message carries a first broadcast code word, and the first broadcast code word includes a group code word of the group in which the third terminal is located and a user code word of the third terminal; and broadcasting, by the third terminal, the first broadcast code word.

With reference to the fourth aspect, in a first possible implementation of the fourth aspect, the group identifier is a temporary identifier allocated by an application server to the group in which the third terminal is located, and the terminal identifier of the third terminal is a temporary identifier allocated by the application server to the third terminal.

According to a fifth aspect of the embodiments of the present disclosure, a device for implementing a function of a first ProSe entity is provided, including:

a receiving unit, configured to receive a first message sent by a first terminal, where the first message carries a group identifier of a group in which a terminal to be monitored by the first terminal is located;

an obtaining unit, configured to obtain, according to the group identifier, a group code word of the group in which the terminal to be monitored by the first terminal is located; and a sending unit, configured to send a second message to the first terminal, where the second message carries the group code word, where the receiving unit is further configured to receive a third message sent by the first terminal, where the third message carries at least one first broadcast code word, the first broadcast code word is a broadcast code word that is of broadcast code words detected by the first terminal and that includes the group code word, and the first broadcast code word further includes a user code word of a terminal that broadcasts the first broadcast code word;

the obtaining unit is further configured to obtain, according to the user code word, a terminal identifier of the terminal that broadcasts the first broadcast code word; and the sending unit is further configured to send a fourth message to the first terminal, where the fourth message carries the terminal identifier.

With reference to the fifth aspect, in a first possible implementation of the fifth aspect, the obtaining unit includes:

a first sending module, configured to send a fifth message to an application server, where the fifth message carries the group identifier, and the fifth message is used to request the application server to allocate a code word to the group in which the terminal to be monitored by the first terminal is located; and a first receiving module, configured to receive a sixth message sent by the application server, where the sixth message carries the group code word.

With reference to the fifth aspect, in a second possible implementation of the fifth aspect, the obtaining unit is specifically configured to generate the group code word according to the group identifier.

With reference to the fifth aspect, in a third possible implementation of the fifth aspect, the obtaining unit includes:

a second sending module, configured to send a seventh message to a second ProSe entity, where the seventh message carries the group identifier, the seventh message is used to request the second ProSe entity to allocate a code word to the group in which the terminal to be monitored by the first terminal is located, the second ProSe entity is a ProSe entity in an HPLMN of a second terminal, and the second terminal is a group management device of the group in which the terminal to be monitored by the first terminal is located; and a second receiving module, configured to receive an eighth message sent by the second ProSe entity, where the eighth message carries the group code word.

With reference to the fifth aspect and the foregoing possible implementations, in a fourth possible implementation of the fifth aspect, the group identifier is a temporary identifier allocated by the application server to the group in which the terminal to be monitored by the first terminal is located, and the terminal identifier is a temporary identifier allocated by the application server to the terminal that broadcasts the first broadcast code word.

According to a sixth aspect of the embodiments of the present disclosure, a first terminal is provided, including:

a sending unit, configured to send a first message to a first ProSe entity, where the first message carries a group identifier of a group in which a terminal to be monitored by the first terminal is located;

a receiving unit, configured to receive a second message sent by the first ProSe entity, where the second message carries a group code word of the group in which the terminal to be monitored by the first terminal is located; and a filtering unit, configured to filter, by using the group code word, broadcast code words detected by the first terminal, to obtain at least one first broadcast code word, where the first broadcast code word includes the group code word, where the sending unit is further configured to send a third message to the first ProSe entity, where the third message carries the at least one first broadcast code word; and the receiving unit is further configured to receive a fourth message sent by the first ProSe entity, where the fourth message carries a terminal identifier of a terminal that broadcasts the first broadcast code word.

With reference to the sixth aspect, in a first possible implementation of the sixth aspect, the group identifier is a temporary identifier allocated by an application server to the group in which the terminal to be monitored by the first terminal is located, and the terminal identifier is a temporary identifier allocated by the application server to the terminal that broadcasts the first broadcast code word.

According to a seventh aspect of the embodiments of the present disclosure, a device for implementing a function of a third ProSe entity is provided, including:

a receiving unit, configured to receive a ninth message sent by a third terminal, where the ninth message carries a terminal identifier of the third terminal and a group identifier of a group in which the third terminal is located;

an obtaining unit, configured to obtain, according to the group identifier, a group code word of the group in which the third terminal is located, and allocate a user code word to the third terminal according to the terminal identifier of the third terminal;

a generation unit, configured to generate a first broadcast code word by using the group code word and the user code word; and a sending unit, configured to send a tenth message to the third terminal, where the tenth message carries the first broadcast code word, and the tenth message is used to instruct the third terminal to broadcast the first broadcast code word.

With reference to the seventh aspect, in a first possible implementation of the seventh aspect, the obtaining unit includes:

a first sending module, configured to send an eleventh message to an application server, where the eleventh message carries the group identifier, and the eleventh message is used to request the application server to allocate a code word to the group in which the third terminal is located; and a first receiving module, configured to receive a twelfth message sent by the application server, where the twelfth message carries the group code word.

With reference to the seventh aspect, in a second possible implementation of the seventh aspect, the obtaining unit is specifically configured to generate the group code word according to the group identifier.

With reference to the seventh aspect, in a third possible implementation of the seventh aspect, the obtaining unit includes:

a second sending module, configured to send a thirteenth message to a second ProSe entity, where the thirteenth message carries the group identifier, the thirteenth message is used to request the second ProSe entity to allocate a code word to the group in which the third terminal is located, the second ProSe entity is a ProSe entity in an HPLMN of a second terminal, and the second terminal is a group management device of the group in which the third terminal is located; and a second receiving module, configured to receive a fourteenth message sent by the second ProSe entity, where the fourteenth message carries the group code word.

With reference to the seventh aspect and the foregoing possible implementations, in a fourth possible implementation of the seventh aspect, the group identifier is a temporary identifier allocated by the application server to the group in which the third terminal is located, and the terminal identifier of the third terminal is a temporary identifier allocated by the application server to the third terminal.

According to an eighth aspect of the embodiments of the present disclosure, a third terminal is provided, including:

a sending unit, configured to send a ninth message to a third ProSe entity, where the ninth message carries a terminal identifier of the third terminal and a group identifier of a group in which the third terminal is located;

a receiving unit, configured to receive a tenth message sent by the third ProSe entity, where the tenth message carries a first broadcast code word, and the first broadcast code word includes a group code word of the group in which the third terminal is located and a user code word of the third terminal; and a broadcast unit, configured to broadcast the first broadcast code word.

With reference to the eighth aspect, in a first possible implementation of the eighth aspect, the group identifier is a temporary identifier allocated by an application server to the group in which the third terminal is located, and the terminal identifier of the third terminal is a temporary identifier allocated by the application server to the third terminal.

According to a ninth aspect of the embodiments of the present disclosure, a device for implementing a function of a first ProSe entity is provided, including:

a receiver, configured to receive a first message sent by a first terminal, where the first message carries a group identifier of a group in which a terminal to be monitored by the first terminal is located;

a processor, configured to obtain, according to the group identifier, a group code word of the group in which the terminal to be monitored by the first terminal is located; and a transmitter, configured to send a second message to the first terminal, where the second message carries the group code word, where the receiver is further configured to receive a third message sent by the first terminal, where the third message carries at least one first broadcast code word, the first broadcast code word is a broadcast code word that is of broadcast code words detected by the first terminal and that includes the group code word, and the first broadcast code word further includes a user code word of a terminal that broadcasts the first broadcast code word;

the processor is further configured to obtain, according to the user code word, a terminal identifier of the terminal that broadcasts the first broadcast code word; and the transmitter is further configured to send a fourth message to the first terminal, where the fourth message carries the terminal identifier.

With reference to the ninth aspect, in a first possible implementation of the ninth aspect, the transmitter is further configured to send a fifth message to an application server, where the fifth message carries the group identifier, and the fifth message is used to request the application server to allocate a code word to the group in which the terminal to be monitored by the first terminal is located; and the receiver is further configured to receive a sixth message sent by the application server, where the sixth message carries the group code word.

With reference to the ninth aspect, in a second possible implementation of the ninth aspect, the processor is specifically configured to generate the group code word according to the group identifier.

With reference to the ninth aspect, in a third possible implementation of the ninth aspect, the transmitter is further configured to send a seventh message to a second ProSe entity, where the seventh message carries the group identifier, the seventh message is used to request the second ProSe entity to allocate a code word to the group in which the terminal to be monitored by the first terminal is located, the second ProSe entity is a ProSe entity in an HPLMN of a second terminal, and the second terminal is a group management device of the group in which the terminal to be monitored by the first terminal is located; and the receiver is further configured to receive an eighth message sent by the second ProSe entity, where the eighth message carries the group code word.

With reference to the ninth aspect and the foregoing possible implementations, in a fourth possible implementation of the ninth aspect, the group identifier is a temporary identifier allocated by the application server to the group in which the terminal to be monitored by the first terminal is located, and the terminal identifier is a temporary identifier allocated by the application server to the terminal that broadcasts the first broadcast code word.

According to a tenth aspect of the embodiments of the present disclosure, a first terminal is provided, including:

a transmitter, configured to send a first message to a first ProSe entity, where the first message carries a group identifier of a group in which a terminal to be monitored by the first terminal is located;

a receiver, configured to receive a second message sent by the first ProSe entity, where the second message carries a group code word of the group in which the terminal to be monitored by the first terminal is located; and a processor, configured to filter, by using the group code word, broadcast code words detected by the first terminal, to obtain at least one first broadcast code word, where the first broadcast code word includes the group code word, where the transmitter is further configured to send a third message to the first ProSe entity, where the third message carries the at least one first broadcast code word; and the receiver is further configured to receive a fourth message sent by the first ProSe entity, where the fourth message carries a terminal identifier of a terminal that broadcasts the first broadcast code word.

With reference to the tenth aspect, in a first possible implementation, the group identifier is a temporary identifier allocated by an application server to the group in which the terminal to be monitored by the first terminal is located, and the terminal identifier is a temporary identifier allocated by the application server to the terminal that broadcasts the first broadcast code word.

According to an eleventh aspect of the embodiments of the present disclosure, a device for implementing a function of a third ProSe entity is provided, including:

a receiver, configured to receive a ninth message sent by a third terminal, where the ninth message carries a terminal identifier of the third terminal and a group identifier of a group in which the third terminal is located;

a processor, configured to: obtain, according to the group identifier, a group code word of the group in which the third terminal is located, allocate a user code word to the third terminal according to the terminal identifier of the third terminal, and generate a first broadcast code word by using the group code word and the user code word; and a transmitter, configured to send a tenth message to the third terminal, where the tenth message carries the first broadcast code word, and the tenth message is used to instruct the third terminal to broadcast the first broadcast code word.

With reference to the eleventh aspect, in a first possible implementation of the eleventh aspect, the transmitter is further configured to send an eleventh message to an application server, where the eleventh message carries the group identifier, and the eleventh message is used to request the application server to allocate a code word to the group in which the third terminal is located; and the receiver is further configured to receive a twelfth message sent by the application server, where the twelfth message carries the group code word.

With reference to the eleventh aspect, in a second possible implementation of the eleventh aspect, the processor is specifically configured to generate the group code word according to the group identifier.

With reference to the eleventh aspect, in a third possible implementation of the eleventh aspect, the transmitter is further configured to send a thirteenth message to a second ProSe entity, where the thirteenth message carries the group identifier, the thirteenth message is used to request the second ProSe entity to allocate a code word to the group in which the third terminal is located, the second ProSe entity is a ProSe entity in an HPLMN of a second terminal, and the second terminal is a group management device of the group in which the third terminal is located; and the receiver is further configured to receive a fourteenth message sent by the second ProSe entity, where the fourteenth message carries the group code word.

With reference to the eleventh aspect and the foregoing possible implementations, in a fourth possible implementation of the eleventh aspect, the group identifier is a temporary identifier allocated by the application server to the group in which the third terminal is located, and the terminal identifier of the third terminal is a temporary identifier allocated by the application server to the third terminal.

According to a twelfth aspect of the embodiments of the present disclosure, a third terminal is provided, including:

a transmitter, configured to send a ninth message to a third ProSe entity, where the ninth message carries a terminal identifier of the third terminal and a group identifier of a group in which the third terminal is located;

a receiver, configured to receive a tenth message sent by the third ProSe entity, where the tenth message carries a first broadcast code word, and the first broadcast code word includes a group code word of the group in which the third terminal is located and a user code word of the third terminal; and a processor, configured to broadcast the first broadcast code word.

With reference to the twelfth aspect, in a first possible implementation of the twelfth aspect, the group identifier is a temporary identifier allocated by an application server to the group in which the third terminal is located, and the terminal identifier of the third terminal is a temporary identifier allocated by the application server to the third terminal.

According to the terminal discovery method and the device provided in the embodiments of the present disclosure, a first ProSe entity receives a first message sent by a first terminal, where the first message carries a group identifier of a group in which a terminal to be monitored by the first terminal is located; the first ProSe entity obtains, according to the group identifier, a group code word of the group in which the terminal to be monitored by the first terminal is located; the first ProSe entity sends a second message to the first terminal, where the second message carries the group code word; the first ProSe entity receives a third message sent by the first terminal, where the third message carries at least one first broadcast code word, the first broadcast code word is a broadcast code word that is of broadcast code words detected by the first terminal and that includes the group code word, and the first broadcast code word further includes a user code word of a terminal that broadcasts the first broadcast code word; and the first ProSe entity obtains, according to the user code word, a terminal identifier of the terminal that broadcasts the first broadcast code word, and sends a fourth message to the first terminal, where the fourth message carries the terminal identifier.

Because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by persons of ordinary skill in the art based on the embodiments of the present disclosure without creative efforts shall fall within the protection scope of the present disclosure.

To facilitate clear description of the technical solutions in the embodiments of the present disclosure, words such as "first", "second", and "third" are used in the embodiments of the present disclosure to distinguish between same items and similar items that have basically same functions and purposes. Persons skilled in the art may understand that the words such as "first", "second", and "third" do not limit a quantity and an execution order.

In addition, for brief descriptions of the following embodiments, the following provides several related definitions:

First terminal: a terminal for performing monitoring.

Second terminal: a group management device of a group in which a terminal to be monitored by the first terminal is located. When the first terminal and the terminal to be monitored by the first terminal are in a same group, and the first terminal is the group management device of the group, the first terminal is the second terminal.

Third terminal: a terminal for performing broadcasting. The terminal to be monitored by the first terminal includes the third terminal. When the third terminal is a group management device of a group in which the third terminal is located, the third terminal is the second terminal.

First ProSe entity: a ProSe entity in a home public land mobile network (HPLMN) of the first terminal. The ProSe entity is an entity that is in a core network and that is responsible for a ProSe. The ProSe entity may be an independent device, or may be carried on another core network device.

Second ProSe entity: a ProSe entity in an HPLMN of the second terminal. When the first terminal and the second terminal are a same terminal, or the HPLMN of the first terminal and the HPLMN of the second terminal are the same, the first ProSe entity and the second ProSe entity are a same ProSe entity.

Third ProSe entity: a ProSe entity in an HPLMN of the third terminal. When the third terminal and the second terminal are a same terminal, or the HPLMN of the third terminal and the HPLMN of the second terminal are the same, the third ProSe entity and the second ProSe entity are a same ProSe entity. When the HPLMN of the third terminal and the HPLMN of the first terminal are the same, the third ProSe entity and the first ProSe entity are a same ProSe entity.

Figure 1:
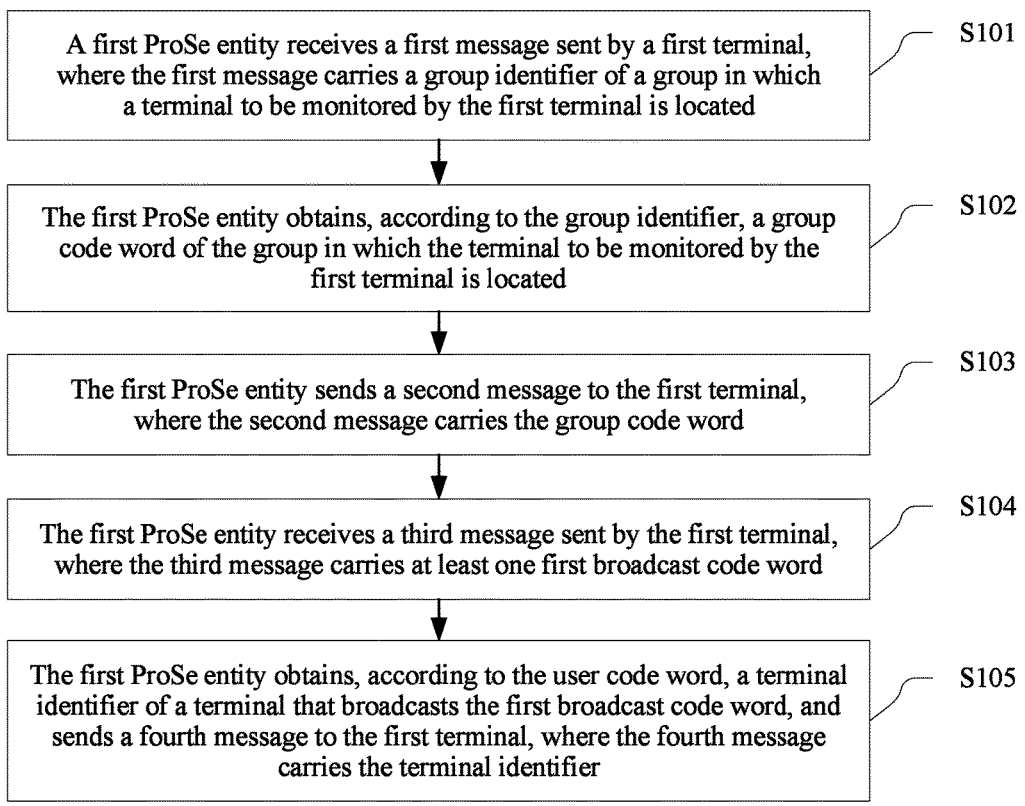
FIG. 1 is a flowchart of a terminal discovery method according to an embodiment of the present disclosure.

As shown in FIG. 1, an embodiment of the present disclosure provides a terminal discovery method, including:

S101. A first ProSe entity receives a first message sent by a first terminal, where the first message carries a group identifier of a group in which a terminal to be monitored by the first terminal is located.

Specifically, the first message may be a discovery request message. The first message is not specifically limited in this embodiment of the present disclosure.

The group identifier may be an application layer group identifier (ID) of the group in which the terminal to be monitored by the first terminal is located, or may be a temporary identifier allocated by an application server to the group in which the terminal to be monitored by the first terminal is located.

The application group identifier is an identifier of a group in an application, and the application group identifier is valid in the application in the long term. The application group identifier may have different representation manners in different applications. For example, the application group identifier is represented by using a group number in one application, and the application group identifier is represented by using a group name in another application.

The application group identifier of the group in which the terminal to be monitored by the first terminal is located may be an application group identifier created by the first terminal, or may be an application group identifier created by a group management device (a second terminal) of the group in which the terminal to be monitored by the first terminal is located, and any terminal of the group in which the terminal to be monitored by the first terminal is located notifies the first terminal of the application group identifier.

The first terminal may send, to the application server, a message that carries the application group identifier of the group in which the terminal to be monitored by the first terminal is located, to obtain the temporary identifier allocated by the application server to the group in which the terminal to be monitored by the first terminal is located. The temporary identifier may include an identifier of an HPLMN of the second terminal. The temporary identifier may have a life cycle, such as one day, that is, the temporary identifier is available in one day.

For example, the terminal to be monitored by the first terminal includes a terminal 1 and a terminal 2, and the terminal 1 and the terminal 2 are in a same group. A group number of the group in which the terminal 1 and the terminal 2 are located is 1234567, a group name is a friend group 1, and a temporary identifier allocated by the application server to the group in which the terminal 1 and the terminal 2 are located is 001. In this case, the group identifier in this embodiment of the present disclosure may be 1234567, or may be the friend group 1, or may be 001. When the terminal 1 and the terminal 2 are not in a same group, the group identifier in this embodiment of the present disclosure includes a group identifier of a group in which the terminal 1 is located and a group identifier of a group in which the terminal 2 is located.

It should be noted that the first message may further carry information such as a terminal identifier of the first terminal or an application identifier of the application server. Other information carried in the first message is not specifically limited in this embodiment of the present disclosure.

S102. The first ProSe entity obtains, according to the group identifier, a group code word of the group in which the terminal to be monitored by the first terminal is located.

The group code word is a code word that is allocated by the application server to the group in which the terminal to be monitored by the first terminal is located, and that is sent to the first terminal by using a ProSe entity in an HPLMN of the terminal to be monitored by the first terminal; or the group code word is a code word that is allocated by a second ProSe entity (that is, a ProSe entity in an HPLMN of a group management device of a group in which the terminal to be monitored by the first terminal is located) to the group in which the terminal to be monitored by the first terminal is located, and that is sent to the first terminal by using the ProSe entity in the HPLMN of the terminal to be monitored by the first terminal. A broadcast code word of the terminal to be monitored by the first terminal is a broadcast code word that includes the group code word and that is allocated by the ProSe entity in the HPLMN of the terminal to be monitored by the first terminal.

S103. The first ProSe entity sends a second message to the first terminal, where the second message carries the group code word.

S104. The first ProSe entity receives a third message sent by the first terminal, where the third message carries at least one first broadcast code word.

The first broadcast code word is a broadcast code word that is of broadcast code words detected by the first terminal and that includes the group code word, and the first broadcast code word further includes a user code word of a terminal that broadcasts the first broadcast code word.

The user code word is the same as a user code word in the prior art, and a total length of the user code word is 184 bits. Generally, the user code word includes some idle bits that are not occupied. The user code word is a code word allocated by a ProSe entity in an HPLMN of the terminal that broadcasts the first broadcast code word to the terminal that broadcasts the first broadcast code word.

The first terminal may simultaneously detect broadcast code words broadcasted by multiple other terminals (terminals that are different from the first terminal), and there may be multiple broadcast code words obtained by the first terminal by filtering, by using the group code word, the broadcast code words detected by the first terminal, that is, there is at least one first broadcast code word. User code words included in first broadcast code words broadcasted by different terminals may be different. When the first terminal sends multiple first broadcast code words that include the group code word to the first ProSe entity, the first ProSe entity may obtain multiple different user code words according to the multiple first broadcast code words.

Different from that in the prior art, what any terminal broadcasts in the prior art is the user code word, and what any terminal broadcasts in this embodiment of the present disclosure is the broadcast code word that includes the group code word and the user code word.

S105. The first ProSe entity obtains, according to the user code word, a terminal identifier of the terminal that broadcasts the first broadcast code word, and sends a fourth message to the first terminal, where the fourth message carries the terminal identifier.

In this way, the first terminal can discover a terminal indicated by the terminal identifier carried in the fourth message.

The user code word may include an identifier of an HPLMN of the terminal that broadcasts the first broadcast code word. The first ProSe entity may pre-store a correspondence between a terminal identifier of the first terminal and a user code word of the first terminal. If the HPLMN of the terminal that broadcasts the first broadcast code word is the same as the HPLMN of the first terminal, the first ProSe entity may search for a correspondence between a terminal identifier and a user code word according to the user code word of the terminal that broadcasts the first broadcast code word, to obtain the terminal identifier of the terminal that broadcasts the first broadcast code word. If the HPLMN of the terminal that broadcasts the first broadcast code word is different from the HPLMN of the first terminal, the first ProSe entity may send, according to the identifier that is of the HPLMN and that is included in the user code word, a terminal identifier request message to the ProSe entity in the HPLMN of the terminal that broadcasts the first broadcast code word, to obtain the terminal identifier of the terminal that broadcasts the first broadcast code word.

Similar to the group identifier, the terminal identifier of the terminal that broadcasts the first broadcast code word may be an application layer user identifier (ID) of the terminal that broadcasts the first broadcast code word, or may be a temporary identifier allocated by the application server to the terminal that broadcasts the first broadcast code word.

The application layer user identifier is an identifier of a terminal in an application, and the application layer user identifier is valid in the application in the long term. The application layer user identifier may be a group number, a user name, or the like.

The temporary identifier allocated by the application server to the terminal that broadcasts the first broadcast code word may have a life cycle, such as one day, that is, the temporary identifier is available in one day.

According to the terminal discovery method provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Further, in S102, there are three cases in which the first ProSe entity obtains, according to the group identifier, a group code word of the group in which the terminal to be monitored by the first terminal is located.

When the group code word is the code word allocated by the application server to the group in which the terminal to be monitored by the first terminal is located, S102 may specifically include:

S102a. The first ProSe entity sends a fifth message to the application server, where the fifth message carries the group identifier.

The fifth message is used to request the application server to allocate a code word to the group in which the terminal to be monitored by the first terminal is located.

S102b. The first ProSe entity receives a sixth message sent by the application server, where the sixth message carries the group code word.

When the group code word is the code word allocated by the second ProSe entity to the group in which the terminal to be monitored by the first terminal is located, and the first ProSe entity and the second ProSe entity are a same ProSe entity (that is, the first terminal and the second terminal belong to a same HPLMN, the second terminal is the group management device of the group in which the terminal to be monitored by the first terminal is located, and the second ProSe entity is the ProSe entity in the HPLMN of the second terminal), S102 may specifically include:

S102c. The first ProSe entity generates the group code word according to the group identifier.

When the group code word is the code word allocated by the second ProSe entity to the group in which the terminal to be monitored by the first terminal is located, and the first terminal and the second terminal belong to different HPLMNs, S102 may specifically include:

S102d. The first ProSe entity sends a seventh message to the second ProSe entity, where the seventh message carries the group identifier.

The seventh message is used to request the second ProSe entity to allocate a code word to the group in which the terminal to be monitored by the first terminal is located.

S102e. The first ProSe entity receives an eighth message sent by the second ProSe entity, where the eighth message carries the group code word.

In a solution of this embodiment of the present disclosure, the group identifier is a temporary identifier allocated by the application server to the group in which the terminal to be monitored by the first terminal is located, and the terminal identifier is a temporary identifier allocated by the application server to the terminal that broadcasts the first broadcast code word. In this solution, the application group identifier and the application layer user identifier are invisible to the first ProSe entity, and this may prevent private information such as the application group identifier and the application layer user identifier from being leaked to a third-party mobile operator (a mobile operator that provides the first ProSe entity).

Figure 2:
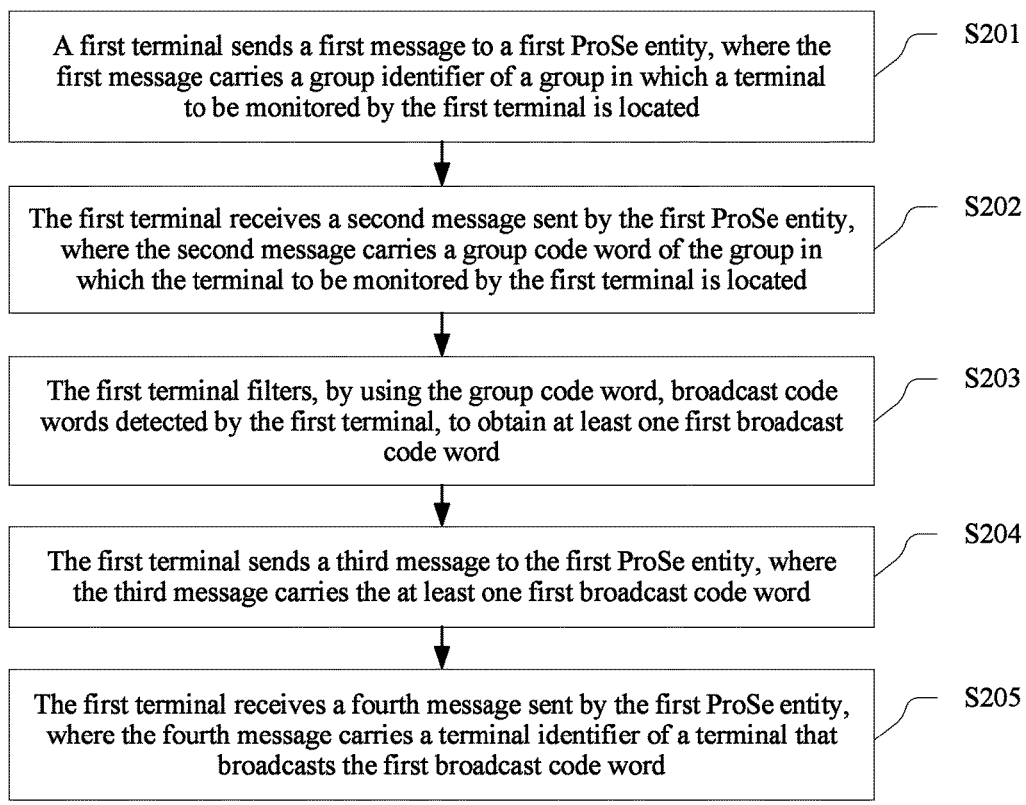
FIG. 2 is a flowchart of another terminal discovery method according to an embodiment of the present disclosure.

As shown in FIG. 2, an embodiment of the present disclosure further provides a terminal discovery method, including:

S201. A first terminal sends a first message to a first ProSe entity, where the first message carries a group identifier of a group in which a terminal to be monitored by the first terminal is located.

S202. The first terminal receives a second message sent by the first ProSe entity, where the second message carries a group code word of the group in which the terminal to be monitored by the first terminal is located.

S203. The first terminal filters, by using the group code word, broadcast code words detected by the first terminal, to obtain at least one first broadcast code word.

The first broadcast code word includes the group code word.

S204. The first terminal sends a third message to the first ProSe entity, where the third message carries the at least one first broadcast code word.

S205. The first terminal receives a fourth message sent by the first ProSe entity, where the fourth message carries a terminal identifier of a terminal that broadcasts the first broadcast code word.

In this way, the first terminal can discover the terminal that broadcasts the first broadcast code word.

It should be noted that for specific descriptions of the first message, the group code word, the terminal identifier, and the like in this embodiment of the present disclosure, refer to related descriptions in the foregoing embodiment, and details are not described in this embodiment of the present disclosure again.

According to the terminal discovery method provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Figure 3:
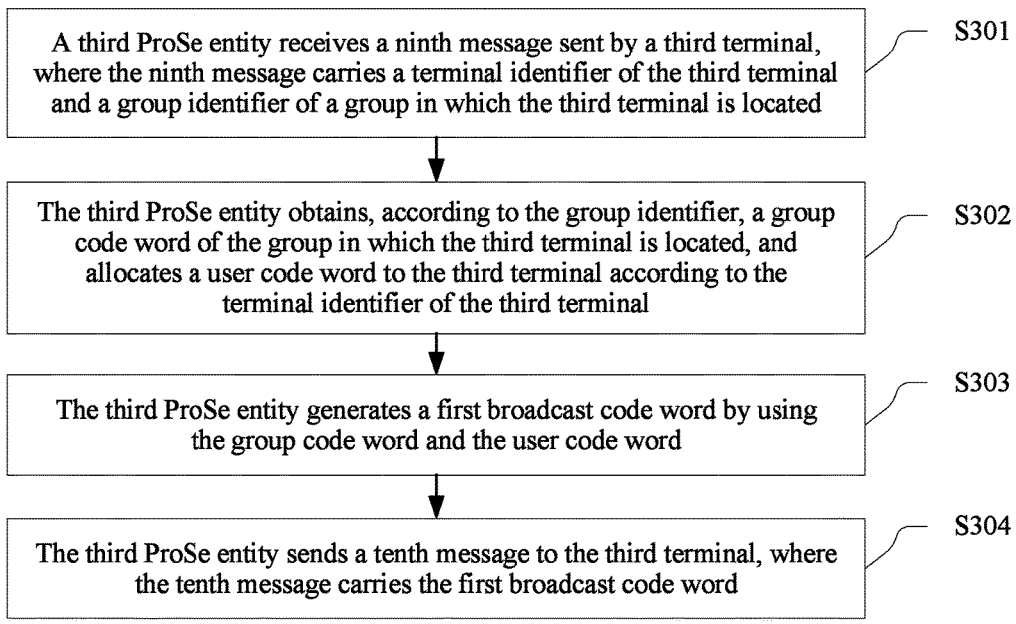
FIG. 3 is a flowchart of another terminal discovery method according to an embodiment of the present disclosure.

An embodiment of the present disclosure further provides a terminal discovery method, where a third terminal is a terminal to be monitored by a first terminal. As shown in FIG. 3, the method includes the following steps:

S301. A third ProSe entity receives a ninth message sent by a third terminal, where the ninth message carries a terminal identifier of the third terminal and a group identifier of a group in which the third terminal is located.

The third ProSe entity is a ProSe entity in an HPLMN of the third terminal.

S302. The third ProSe entity obtains, according to the group identifier, a group code word of the group in which the third terminal is located, and allocates a user code word to the third terminal according to the terminal identifier of the third terminal.

The group code word is a code word that is allocated by an application server to the group in which the third terminal is located, and that is sent to the third terminal by using the third ProSe entity, or the group code word is a code word that is allocated by a second ProSe entity to the group in which the third terminal is located, and that is sent to the third terminal by using the third ProSe entity. The user code word is the same as a user code word in the prior art, and a total length of the user code word is 184 bits. Generally, the user code word includes some idle bits that are not occupied.

S303. The third ProSe entity generates a first broadcast code word by using the group code word and the user code word.

Specifically, the third ProSe entity may write the group code word into an idle bit of the user code word to generate the first broadcast code word.

S304. The third ProSe entity sends a tenth message to the third terminal, where the tenth message carries the first broadcast code word.

The tenth message is used to instruct the third terminal to broadcast the first broadcast code word, so that a first terminal monitors the first broadcast code word and discovers the third terminal.

It should be noted that for specific descriptions of the group identifier, the terminal identifier, and the like in this embodiment of the present disclosure, refer to related descriptions in the foregoing embodiments, and details are not described in this embodiment of the present disclosure again.

According to the terminal discovery method provided in this embodiment of the present disclosure, a first broadcast code word allocated by a third ProSe entity to a third terminal includes a group code word. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

Further, in S302, there are three cases in which the third ProSe entity obtains, according to the group identifier, a group code word of the group in which the third terminal is located.

When the group code word is the code word allocated by the application server to the group in which the third terminal is located, S302 may specifically include:

S302a. The third ProSe entity sends an eleventh message to the application server, where the eleventh message carries the group identifier.

The eleventh message is used to request the application server to allocate a code word to the group in which the third terminal is located.

S302b. The third ProSe entity receives a twelfth message sent by the application server, where the twelfth message carries the group code word.

When the group code word is the code word allocated by the second ProSe entity to the group in which the third terminal is located, and the third ProSe entity and the second ProSe entity are a same ProSe entity (that is, the third terminal and a second terminal belong to a same HPLMN, the second terminal is a group management device of the group in which the third terminal is located, and the second ProSe entity is a ProSe entity in an HPLMN of the second terminal), S302 may specifically include:

S302c. The third ProSe entity generates the group code word according to the group identifier.

When the group code word is the code word allocated by the second ProSe entity to the group in which the third terminal is located, and the third terminal and the second terminal belong to different HPLMNs, S302 may specifically include:

S302d. The third ProSe entity sends a thirteenth message to the second ProSe entity, where the thirteenth message carries the group identifier.

The thirteenth message is used to request the second ProSe entity to allocate a code word to the group in which the third terminal is located.

S302e. The third ProSe entity receives a fourteenth message sent by the second ProSe entity, where the fourteenth message carries the group code word.

In a solution of this embodiment of the present disclosure, the group identifier is a temporary identifier allocated by the application server to the group in which the third terminal is located, and the terminal identifier is a temporary identifier allocated by the application server to the terminal that broadcasts the first broadcast code word. In this solution, an application group identifier and an application layer user identifier are invisible to the third ProSe entity, and this may prevent private information such as the application group identifier and the application layer user identifier from being leaked to a third-party mobile operator (a mobile operator that provides the third ProSe entity).

Figure 4:
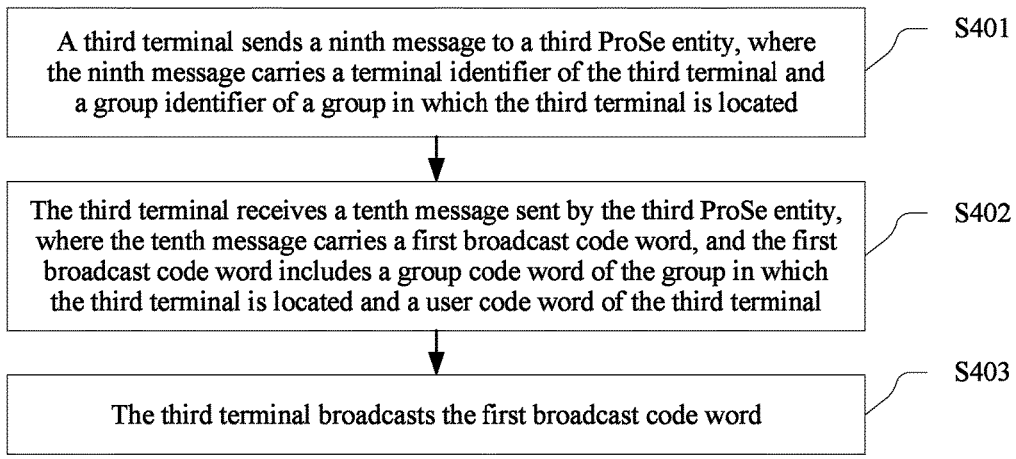
FIG. 4 is a flowchart of another terminal discovery method according to an embodiment of the present disclosure.

An embodiment of the present disclosure further provides a terminal discovery method, where a third terminal is a terminal to be monitored by a first terminal. As shown in FIG. 4, the method includes the following steps:

S401. A third terminal sends a ninth message to a third ProSe entity, where the ninth message carries a terminal identifier of the third terminal and a group identifier of a group in which the third terminal is located.

S402. The third terminal receives a tenth message sent by the third ProSe entity, where the tenth message carries a first broadcast code word, and the first broadcast code word includes a group code word of the group in which the third terminal is located and a user code word of the third terminal.

S403. The third terminal broadcasts the first broadcast code word.

It should be noted that for specific descriptions of the group identifier, the group code word, the user code word, the terminal identifier, and the like in this embodiment of the present disclosure, refer to related descriptions in the foregoing embodiments, and details are not described in this embodiment of the present disclosure again.

According to the terminal discovery method provided in this embodiment of the present disclosure, a first broadcast code word broadcasted by a third terminal includes a group code word of a group in which the third terminal is located and a user code word of the third terminal. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

Figure 5:
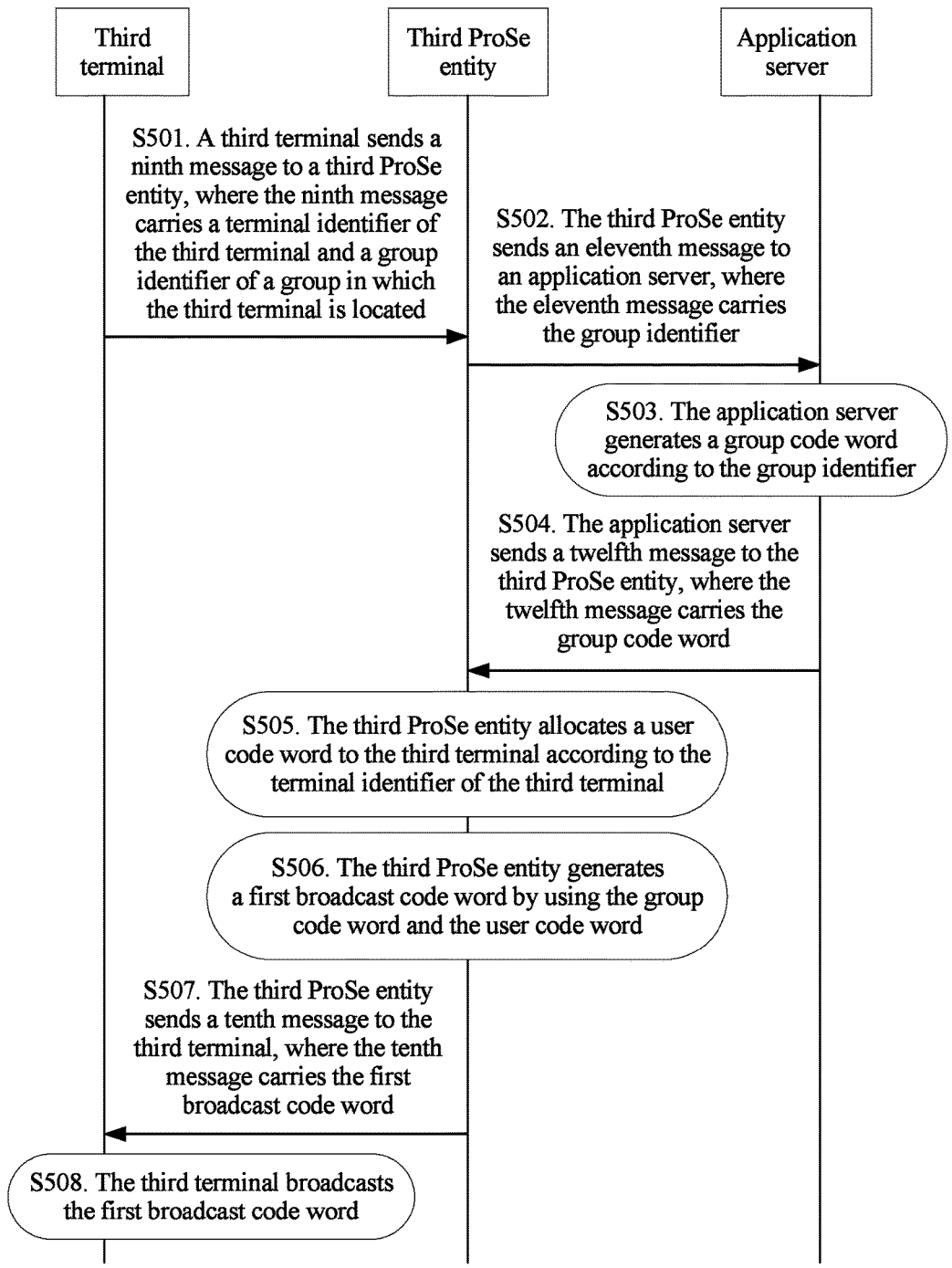
FIG. 5 is a flowchart of another terminal discovery method according to an embodiment of the present disclosure.

An embodiment of the present disclosure further provides a terminal discovery method. Specifically, interaction between a third terminal, a third ProSe entity, and an application server is used as an example for description, and a group code word is a code word allocated by the application server to a group in which the third terminal is located. As shown in FIG. 5, the method includes the following steps:

S501. A third terminal sends a ninth message to a third ProSe entity, where the ninth message carries a terminal identifier of the third terminal and a group identifier of a group in which the third terminal is located.

The third ProSe entity is a ProSe entity in an HPLMN of the third terminal.

S502. The third ProSe entity sends an eleventh message to an application server, where the eleventh message carries the group identifier.

The eleventh message is used to request the application server to allocate a code word to the group in which the third terminal is located.

S503. The application server generates a group code word according to the group identifier.

S504. The application server sends a twelfth message to the third ProSe entity, where the twelfth message carries the group code word.

S505. The third ProSe entity allocates a user code word to the third terminal according to the terminal identifier of the third terminal.

S506. The third ProSe entity generates a first broadcast code word by using the group code word and the user code word.

S507. The third ProSe entity sends a tenth message to the third terminal, where the tenth message carries the first broadcast code word.

The tenth message is used to instruct the third terminal to broadcast the first broadcast code word.

S508. The third terminal broadcasts the first broadcast code word.

It should be noted that for specific descriptions of the group identifier, the group code word, the user code word, the terminal identifier, and the like in this embodiment of the present disclosure, refer to related descriptions in the foregoing embodiments, and details are not described in this embodiment of the present disclosure again.

According to the terminal discovery method provided in this embodiment of the present disclosure, a first broadcast code word allocated by a third ProSe entity to a third terminal includes a group code word. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

Figure 6:
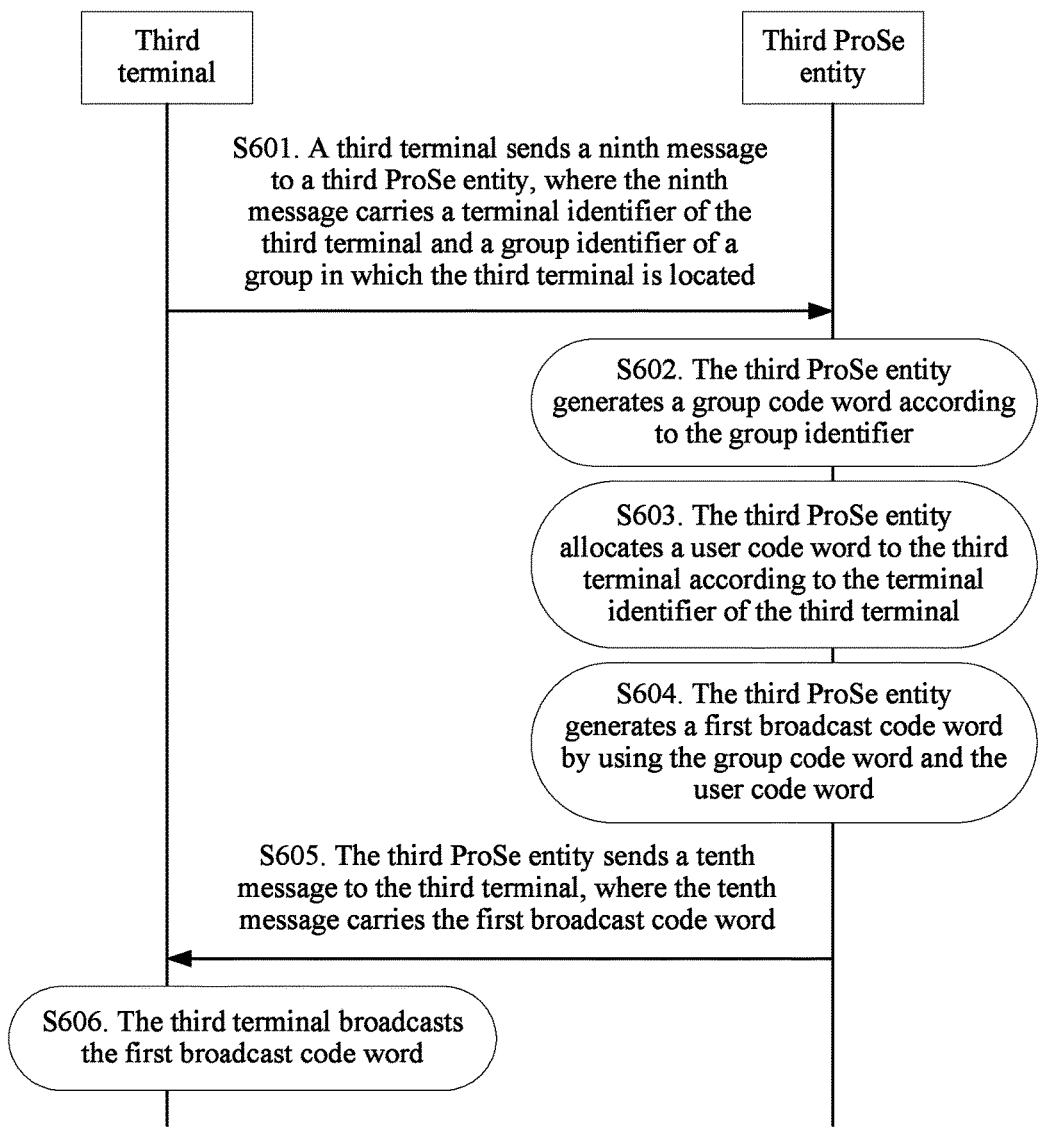
FIG. 6 is a flowchart of another terminal discovery method according to an embodiment of the present disclosure.

An embodiment of the present disclosure further provides a terminal discovery method. Specifically, interaction between a third terminal and a third ProSe entity is used as an example for description, a group code word is a code word allocated by a second ProSe entity to a group in which the third terminal is located, and the third ProSe entity and the second ProSe entity are a same ProSe entity. As shown in FIG. 6, the method includes the following steps:

S601. A third terminal sends a ninth message to a third ProSe entity, where the ninth message carries a terminal identifier of the third terminal and a group identifier of a group in which the third terminal is located.

The third ProSe entity is a ProSe entity in an HPLMN of the third terminal.

S602. The third ProSe entity generates a group code word according to the group identifier.

S603. The third ProSe entity allocates a user code word to the third terminal according to the terminal identifier of the third terminal.

S604. The third ProSe entity generates a first broadcast code word by using the group code word and the user code word.

S605. The third ProSe entity sends a tenth message to the third terminal, where the tenth message carries the first broadcast code word.

The tenth message is used to instruct the third terminal to broadcast the first broadcast code word.

S606. The third terminal broadcasts the first broadcast code word.

It should be noted that for specific descriptions of the group identifier, the group code word, the user code word, the terminal identifier, and the like in this embodiment of the present disclosure, refer to related descriptions in the foregoing embodiments, and details are not described in this embodiment of the present disclosure again.

According to the terminal discovery method provided in this embodiment of the present disclosure, a first broadcast code word allocated by a third ProSe entity to a third terminal includes a group code word. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

Figure 7:
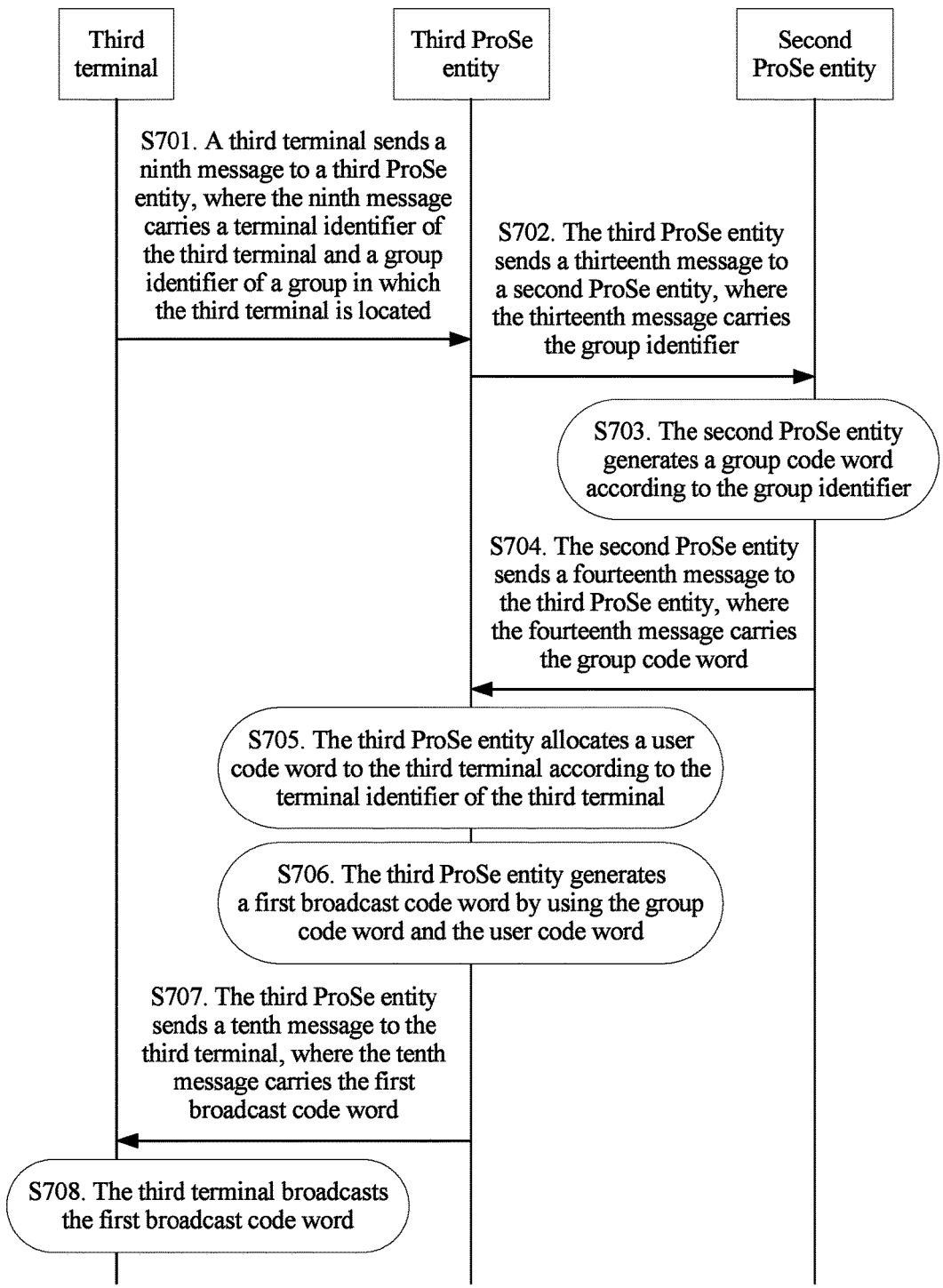
FIG. 7 is a flowchart of another terminal discovery method according to an embodiment of the present disclosure.

An embodiment of the present disclosure further provides a terminal discovery method. Specifically, interaction between a third terminal, a third ProSe entity, and a second ProSe entity is used as an example for description, a group code word is a code word allocated by the second ProSe entity to a group in which the third terminal is located, and the third ProSe entity and the second ProSe entity are different. As shown in FIG. 7, the method includes the following steps:

S701. A third terminal sends a ninth message to a third ProSe entity, where the ninth message carries a terminal identifier of the third terminal and a group identifier of a group in which the third terminal is located.

The third ProSe entity is a ProSe entity in an HPLMN of the third terminal.

S702. The third ProSe entity sends a thirteenth message to a second ProSe entity, where the thirteenth message carries the group identifier.

The thirteenth message is used to request the second ProSe entity to allocate a code word to the group in which the third terminal is located, the second ProSe entity is a ProSe entity in an HPLMN of a second terminal, and the second terminal is a group management device of the group in which the third terminal is located.

S703. The second ProSe entity generates a group code word according to the group identifier.

S704. The second ProSe entity sends a fourteenth message to the third ProSe entity, where the fourteenth message carries the group code word.

S705. The third ProSe entity allocates a user code word to the third terminal according to the terminal identifier of the third terminal.

S706. The third ProSe entity generates a first broadcast code word by using the group code word and the user code word.

S707. The third ProSe entity sends a tenth message to the third terminal, where the tenth message carries the first broadcast code word.

The tenth message is used to instruct the third terminal to broadcast the first broadcast code word.

S708. The third terminal broadcasts the first broadcast code word.

It should be noted that for specific descriptions of the group identifier, the group code word, the user code word, the terminal identifier, and the like in this embodiment of the present disclosure, refer to related descriptions in the foregoing embodiments, and details are not described in this embodiment of the present disclosure again.

According to the terminal discovery method provided in this embodiment of the present disclosure, a first broadcast code word allocated by a third ProSe entity to a third terminal includes a group code word. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

Figure 8:
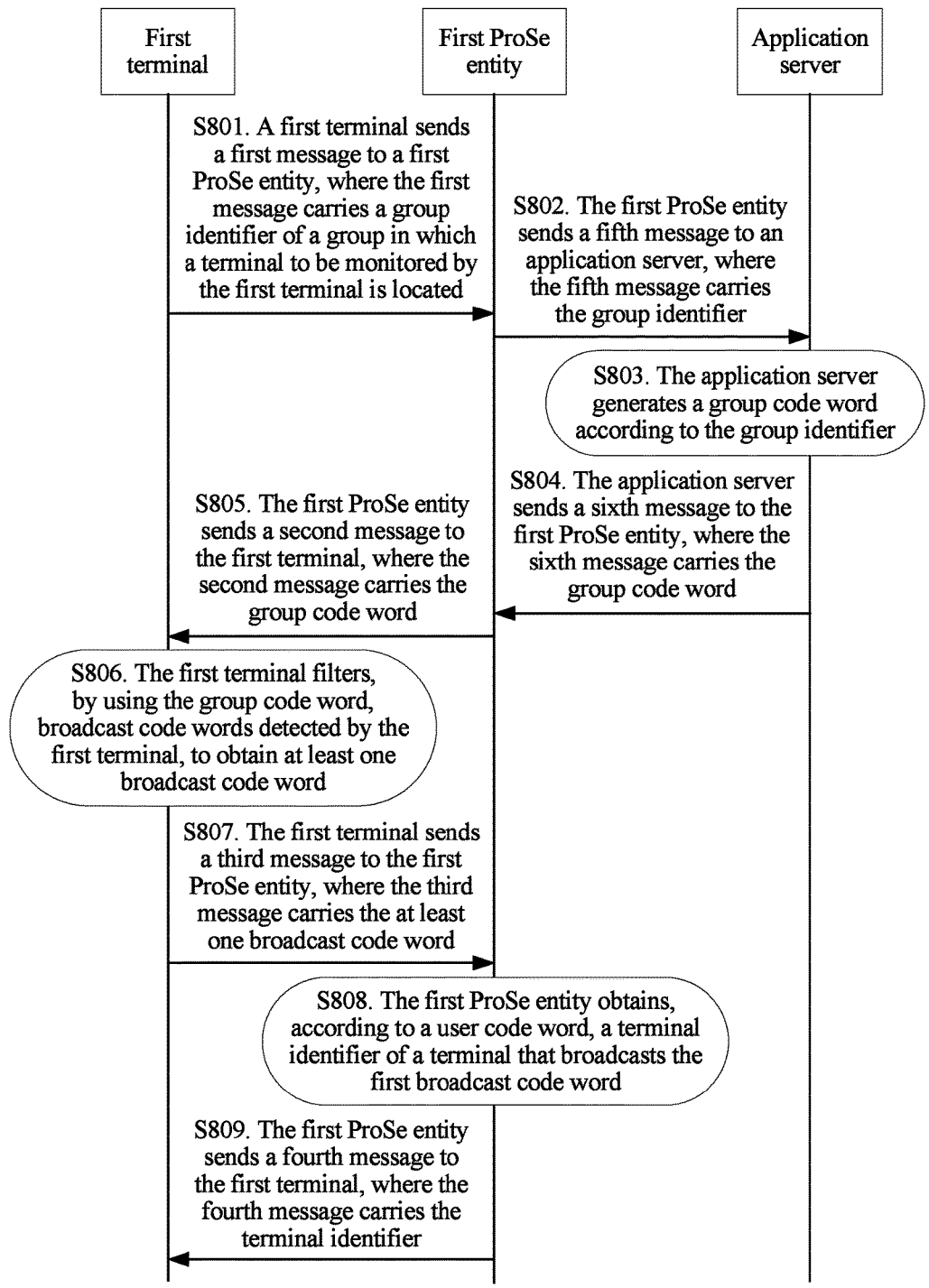
FIG. 8 is a flowchart of another terminal discovery method according to an embodiment of the present disclosure.

An embodiment of the present disclosure further provides a terminal discovery method. Specifically, interaction between a first terminal, a first ProSe entity, and an application server is used as an example for description, and a group code word is a code word allocated by the application server to a group in which a terminal to be monitored by the first terminal is located. As shown in FIG. 8, the method includes the following steps:

S801. A first terminal sends a first message to a first ProSe entity, where the first message carries a group identifier of a group in which a terminal to be monitored by the first terminal is located.

S802. The first ProSe entity sends a fifth message to an application server, where the fifth message carries the group identifier.

The fifth message is used to request the application server to allocate a code word to the group in which the terminal to be monitored by the first terminal is located.

S803. The application server generates a group code word according to the group identifier.

S804. The application server sends a sixth message to the first ProSe entity, where the sixth message carries the group code word.

S805. The first ProSe entity sends a second message to the first terminal, where the second message carries the group code word.

S806. The first terminal filters, by using the group code word, broadcast code words detected by the first terminal, to obtain at least one broadcast code word.

The first broadcast code word further includes a user code word of a terminal that broadcasts the first broadcast code word.

S807. The first terminal sends a third message to the first ProSe entity, where the third message carries the at least one broadcast code word.

S808. The first ProSe entity obtains, according to the user code word, a terminal identifier of the terminal that broadcasts the first broadcast code word.

S809. The first ProSe entity sends a fourth message to the first terminal, where the fourth message carries the terminal identifier.

It should be noted that for specific descriptions of the group identifier, the group code word, the user code word, the terminal identifier, and the like in this embodiment of the present disclosure, refer to related descriptions in the foregoing embodiments, and details are not described in this embodiment of the present disclosure again.

According to the terminal discovery method provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Figure 9:
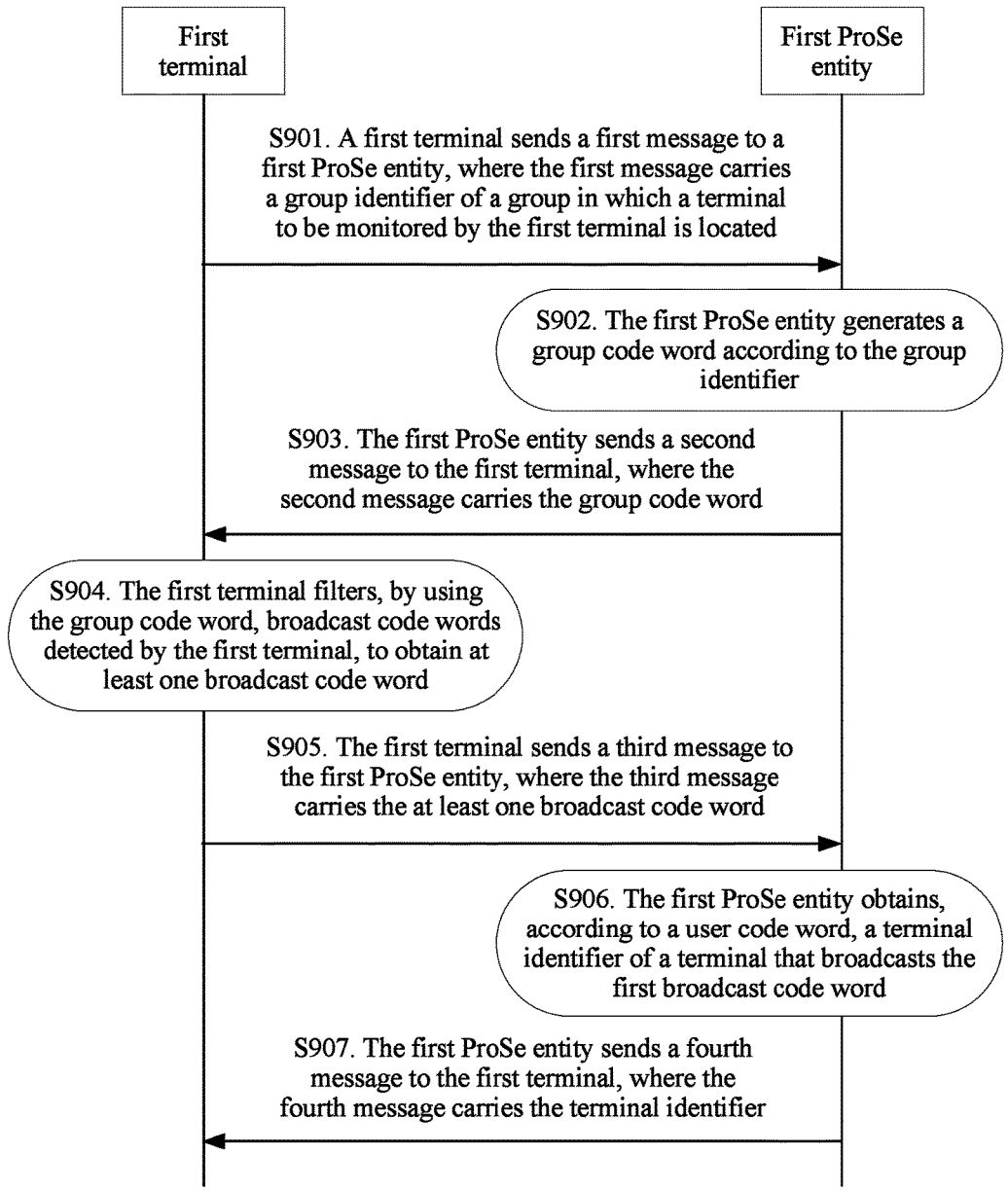
FIG. 9 is a flowchart of another terminal discovery method according to an embodiment of the present disclosure.

An embodiment of the present disclosure further provides a terminal discovery method. Specifically, interaction between a first terminal and a first ProSe entity is used as an example for description, a group code word is a code word allocated by a second ProSe entity to a group in which a terminal to be monitored by the first terminal is located, and the first ProSe entity and the second ProSe entity are a same ProSe entity. As shown in FIG. 9, the method includes the following steps:

S901. A first terminal sends a first message to a first ProSe entity, where the first message carries a group identifier of a group in which a terminal to be monitored by the first terminal is located.

S902. The first ProSe entity generates a group code word according to the group identifier.

S903. The first ProSe entity sends a second message to the first terminal, where the second message carries the group code word.

S904. The first terminal filters, by using the group code word, broadcast code words detected by the first terminal, to obtain at least one broadcast code word.

The first broadcast code word further includes a user code word of a terminal that broadcasts the first broadcast code word.

S905. The first terminal sends a third message to the first ProSe entity, where the third message carries the at least one broadcast code word.

S906. The first ProSe entity obtains, according to the user code word, a terminal identifier of the terminal that broadcasts the first broadcast code word.

S907. The first ProSe entity sends a fourth message to the first terminal, where the fourth message carries the terminal identifier.

It should be noted that for specific descriptions of the group identifier, the group code word, the user code word, the terminal identifier, and the like in this embodiment of the present disclosure, refer to related descriptions in the foregoing embodiments, and details are not described in this embodiment of the present disclosure again.

According to the terminal discovery method provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Figure 10:
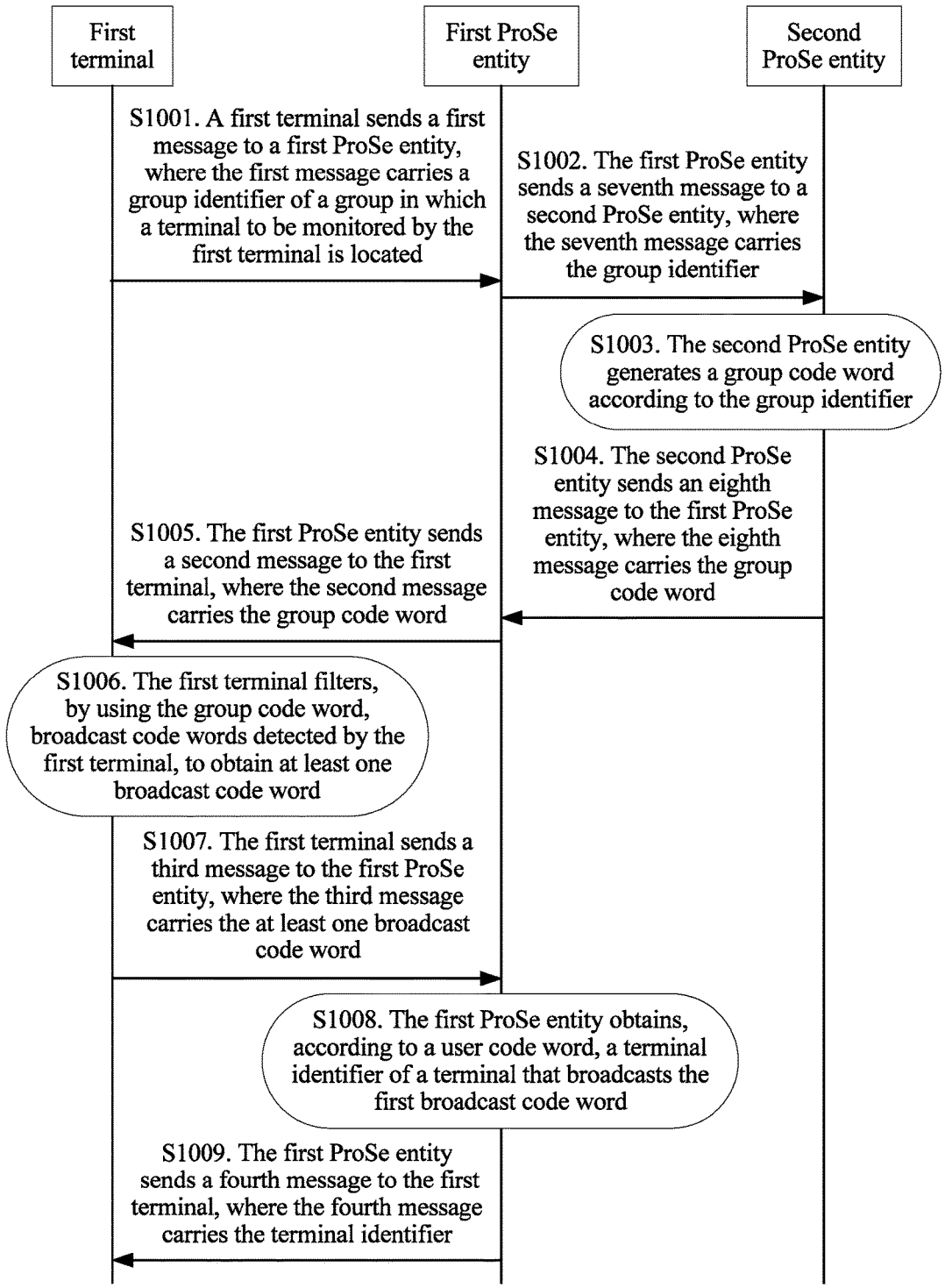
FIG. 10 is a flowchart of another terminal discovery method according to an embodiment of the present disclosure.

An embodiment of the present disclosure further provides a terminal discovery method. Specifically, interaction between a first terminal, a first ProSe entity, and a second ProSe entity is used as an example for description, a group code word is a code word allocated by the second ProSe entity to a group in which a terminal to be monitored by the first terminal is located, and the first ProSe entity and the second ProSe entity are different. As shown in FIG. 10, the method includes the following steps:

S1001. A first terminal sends a first message to a first ProSe entity, where the first message carries a group identifier of a group in which a terminal to be monitored by the first terminal is located.

S1002. The first ProSe entity sends a seventh message to a second ProSe entity, where the seventh message carries the group identifier.

The seventh message is used to request the second ProSe entity to allocate a code word to the group in which the terminal to be monitored by the first terminal is located, the second ProSe entity is a ProSe entity in an HPLMN of a second terminal, and the second terminal is a group management device of the group in which the terminal to be monitored by the first terminal is located.

S1003. The second ProSe entity generates a group code word according to the group identifier.

S1004. The second ProSe entity sends an eighth message to the first ProSe entity, where the eighth message carries the group code word.

S1005. The first ProSe entity sends a second message to the first terminal, where the second message carries the group code word.

S1006. The first terminal filters, by using the group code word, broadcast code words detected by the first terminal, to obtain at least one broadcast code word.

The first broadcast code word further includes a user code word of a terminal that broadcasts the first broadcast code word.

S1007. The first terminal sends a third message to the first ProSe entity, where the third message carries the at least one broadcast code word.

S1008. The first ProSe entity obtains, according to the user code word, a terminal identifier of the terminal that broadcasts the first broadcast code word.

S1009. The first ProSe entity sends a fourth message to the first terminal, where the fourth message carries the terminal identifier.

It should be noted that for specific descriptions of the group identifier, the group code word, the user code word, the terminal identifier, and the like in this embodiment of the present disclosure, refer to related descriptions in the foregoing embodiments, and details are not described in this embodiment of the present disclosure again.

According to the terminal discovery method provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Figure 11:
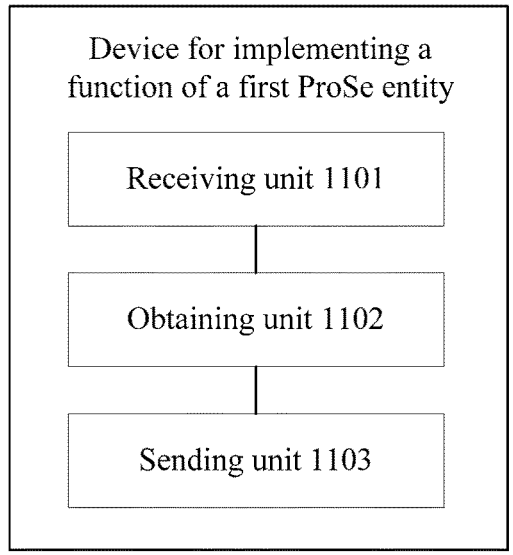
FIG. 11 is a schematic diagram of composition of a device for implementing a function of a first ProSe entity according to an embodiment of the present disclosure.

An embodiment of the present disclosure further provides a device for implementing a function of a first ProSe entity, configured to execute the terminal discovery methods shown in FIG. 1, FIG. 8, FIG. 9, and FIG. 10. As shown in FIG. 11, the device includes a receiving unit 1101, an obtaining unit 1102, and a sending unit 1103.

The receiving unit 1101 is configured to receive a first message sent by a first terminal, where the first message carries a group identifier of a group in which a terminal to be monitored by the first terminal is located.

The obtaining unit 1102 is configured to obtain, according to the group identifier, a group code word of the group in which the terminal to be monitored by the first terminal is located.

The sending unit 1103 is configured to send a second message to the first terminal, where the second message carries the group code word.

The receiving unit 1101 is further configured to receive a third message sent by the first terminal, where the third message carries at least one first broadcast code word, the first broadcast code word is a broadcast code word that is of broadcast code words detected by the first terminal and that includes the group code word, and the first broadcast code word further includes a user code word of a terminal that broadcasts the first broadcast code word.

The obtaining unit 1102 is further configured to obtain, according to the user code word, a terminal identifier of the terminal that broadcasts the first broadcast code word.

The sending unit 1103 is further configured to send a fourth message to the first terminal, where the fourth message carries the terminal identifier.

Figure 12:
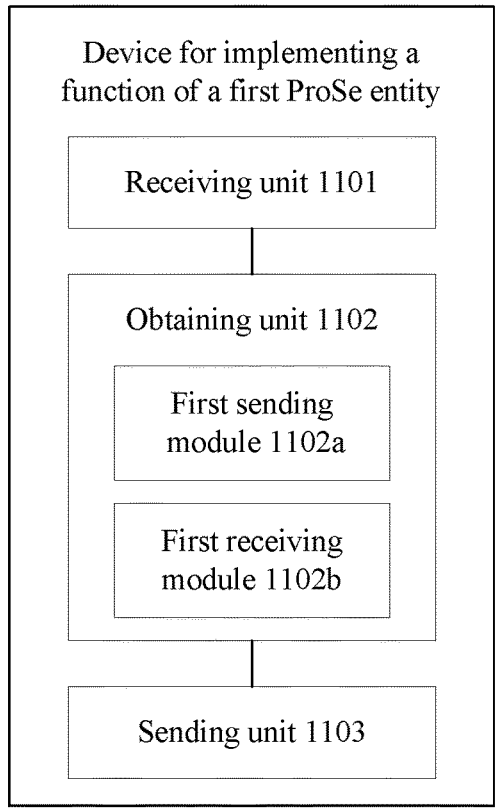
FIG. 12 is a schematic diagram of composition of another device for implementing a function of a first ProSe entity according to an embodiment of the present disclosure.

Further, in a first case, as shown in FIG. 12, the obtaining unit 1102 includes a first sending module 1102a and a first receiving module 1102b.

The first sending module 1102a is configured to send a fifth message to an application server, where the fifth message carries the group identifier, and the fifth message is used to request the application server to allocate a code word to the group in which the terminal to be monitored by the first terminal is located.

The first receiving module 1102b is configured to receive a sixth message sent by the application server, where the sixth message carries the group code word.

Further, in a second case, the obtaining unit 1102 is specifically configured to generate the group code word according to the group identifier.

Figure 13:
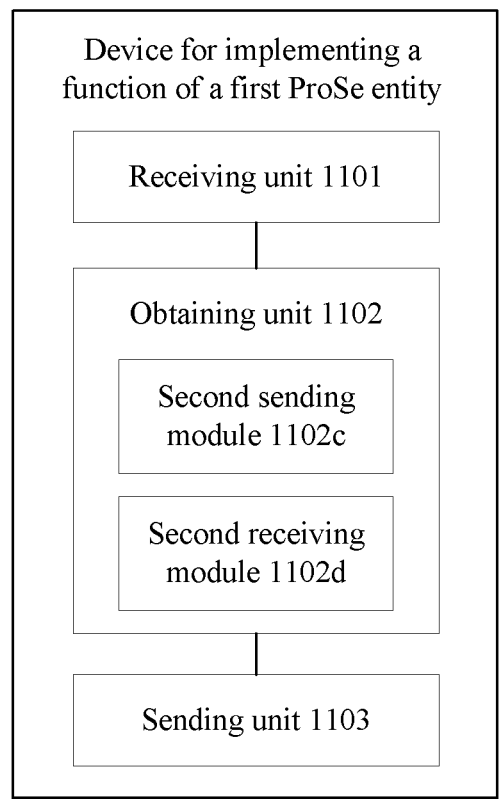
FIG. 13 is a schematic diagram of composition of another device for implementing a function of a first ProSe entity according to an embodiment of the present disclosure.

Further, in a third case, as shown in FIG. 13, the obtaining unit 1102 includes a second sending module 1102c and a second receiving module 1102d.

The second sending module 1102c is configured to send a seventh message to a second ProSe entity, where the seventh message carries the group identifier, the seventh message is used to request the second ProSe entity to allocate a code word to the group in which the terminal to be monitored by the first terminal is located, the second ProSe entity is a ProSe entity in an HPLMN of a second terminal, and the second terminal is a group management device of the group in which the terminal to be monitored by the first terminal is located.

The second receiving module 1102d is configured to receive an eighth message sent by the second ProSe entity, where the eighth message carries the group code word.

Optionally, the group identifier is a temporary identifier allocated by an application server to the group in which the terminal to be monitored by the first terminal is located, and the terminal identifier is a temporary identifier allocated by the application server to the terminal that broadcasts the first broadcast code word.

It should be noted that for specific descriptions of some function modules in the device for implementing a function of a first ProSe entity provided in this embodiment of the present disclosure, refer to corresponding content in the method embodiments, and details are not described in this embodiment again.

According to the device for implementing a function of a first ProSe entity provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Figure 14:
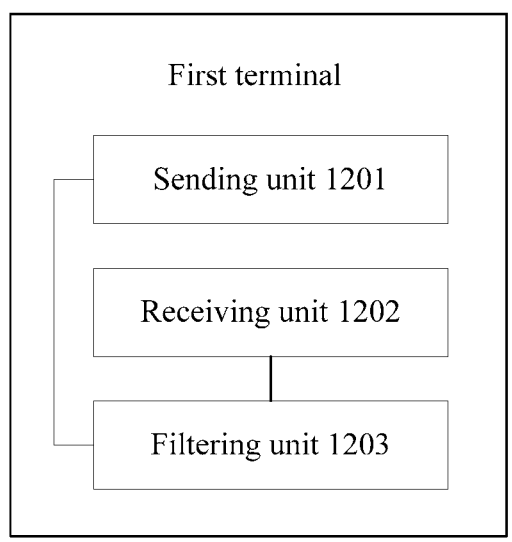
FIG. 14 is a schematic diagram of composition of a first terminal according to an embodiment of the present disclosure.

An embodiment of the present disclosure further provides a first terminal, configured to execute the terminal discovery methods shown in FIG. 2, FIG. 8, FIG. 9, and FIG. 10. As shown in FIG. 14, the first terminal includes a sending unit 1201, a receiving unit 1202, and a filtering unit 1203.

The sending unit 1201 is configured to send a first message to a first ProSe entity, where the first message carries a group identifier of a group in which a terminal to be monitored by the first terminal is located.

The receiving unit 1202 is configured to receive a second message sent by the first ProSe entity, where the second message carries a group code word of the group in which the terminal to be monitored by the first terminal is located.

The filtering unit 1203 is configured to filter, by using the group code word, broadcast code words detected by the first terminal, to obtain at least one first broadcast code word, where the first broadcast code word includes the group code word.

The sending unit 1201 is further configured to send a third message to the first ProSe entity, where the third message carries the at least one first broadcast code word.

The receiving unit 1202 is further configured to receive a fourth message sent by the first ProSe entity, where the fourth message carries a terminal identifier of a terminal that broadcasts the first broadcast code word.

Optionally, the group identifier is a temporary identifier allocated by an application server to the group in which the terminal to be monitored by the first terminal is located, and the terminal identifier is a temporary identifier allocated by the application server to the terminal that broadcasts the first broadcast code word.

It should be noted that for specific descriptions of some function modules in the first terminal provided in this embodiment of the present disclosure, refer to corresponding content in the method embodiments, and details are not described in this embodiment again.

According to the first terminal provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Figure 15:
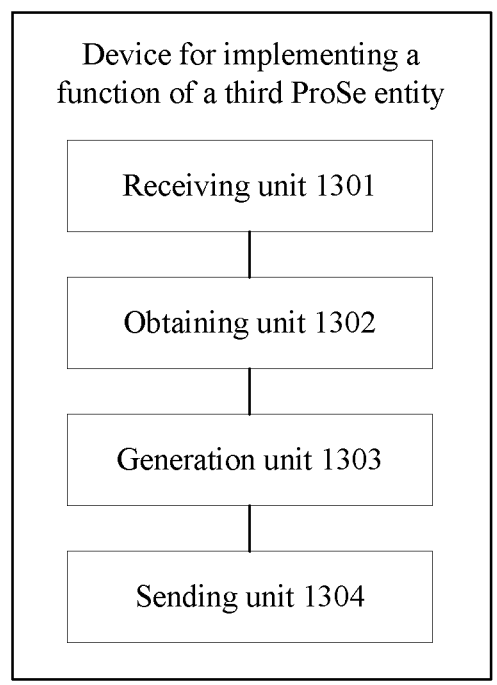
FIG. 15 is a schematic diagram of composition of a device for implementing a function of a third ProSe entity according to an embodiment of the present disclosure.

An embodiment of the present disclosure further provides a device for implementing a function of a third ProSe entity, configured to execute the terminal discovery methods shown in FIG. 3, FIG. 5, FIG. 6, and FIG. 7. As shown in FIG. 15, the device includes a receiving unit 1301, an obtaining unit 1302, a generation unit 1303, and a sending unit 1304.

The receiving unit 1301 is configured to receive a ninth message sent by a third terminal, where the ninth message carries a terminal identifier of the third terminal and a group identifier of a group in which the third terminal is located.

The obtaining unit 1302 is configured to obtain, according to the group identifier, a group code word of the group in which the third terminal is located, and allocate a user code word to the third terminal according to the terminal identifier of the third terminal.

The generation unit 1303 is configured to generate a first broadcast code word by using the group code word and the user code word.

The sending unit 1304 is configured to send a tenth message to the third terminal, where the tenth message carries the first broadcast code word, and the tenth message is used to instruct the third terminal to broadcast the first broadcast code word.

Figure 16:
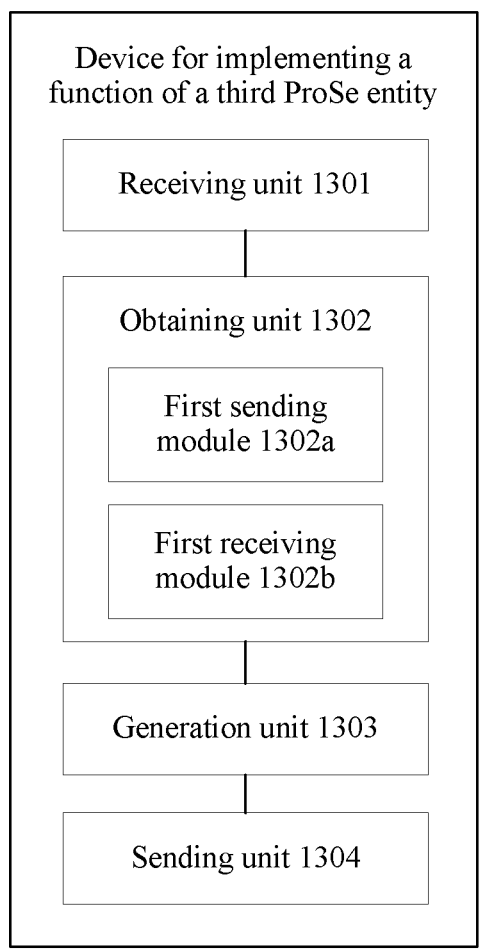
FIG. 16 is a schematic diagram of composition of another device for implementing a function of a third ProSe entity according to an embodiment of the present disclosure.

Further, in a first case, as shown in FIG. 16, the obtaining unit 1302 includes a first sending module 1302a and a first receiving module 1302b.

The first sending module 1302a is configured to send an eleventh message to an application server, where the eleventh message carries the group identifier, and the eleventh message is used to request the application server to allocate a code word to the group in which the third terminal is located.

The first receiving module 1302b is configured to receive a twelfth message sent by the application server, where the twelfth message carries the group code word.

Further, in a second case, the obtaining unit 1302 is specifically configured to generate the group code word according to the group identifier.

Figure 17:
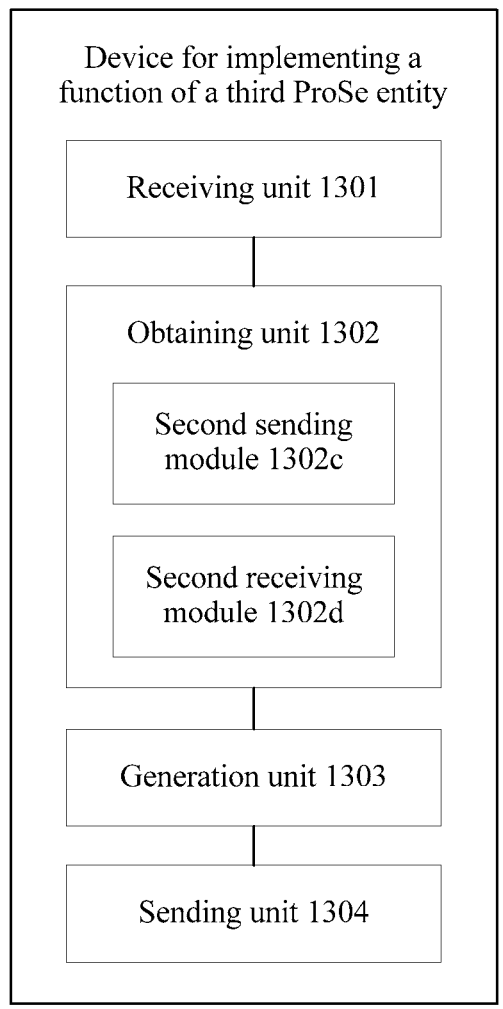
FIG. 17 is a schematic diagram of composition of another device for implementing a function of a third ProSe entity according to an embodiment of the present disclosure.

Further, in a third case, as shown in FIG. 17, the obtaining unit 1302 includes a second sending module 1302c and a second receiving module 1302d.

The second sending module 1302c is configured to send a thirteenth message to a second ProSe entity, where the thirteenth message carries the group identifier, the thirteenth message is used to request the second ProSe entity to allocate a code word to the group in which the third terminal is located, the second ProSe entity is a ProSe entity in an HPLMN of a second terminal, and the second terminal is a group management device of the group in which the third terminal is located.

The second receiving module 1302d is configured to receive a fourteenth message sent by the second ProSe entity, where the fourteenth message carries the group code word.

Optionally, the group identifier is a temporary identifier allocated by an application server to the group in which the third terminal is located, and the terminal identifier of the third terminal is a temporary identifier allocated by the application server to the third terminal.

It should be noted that for specific descriptions of some function modules in the device for implementing a function of a third ProSe entity provided in this embodiment of the present disclosure, refer to corresponding content in the method embodiments, and details are not described in this embodiment again.

According to the device for implementing a function of a third ProSe entity provided in this embodiment of the present disclosure, a first broadcast code word allocated by a third ProSe entity to a third terminal includes a group code word. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

Figure 18:
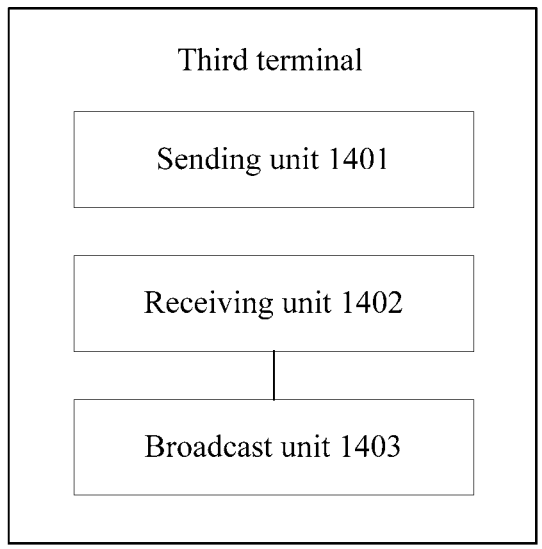
FIG. 18 is a schematic diagram of composition of a third terminal according to an embodiment of the present disclosure.

An embodiment of the present disclosure further provides a third terminal, configured to execute the terminal discovery methods shown in FIG. 4, FIG. 5, FIG. 6, and FIG. 7. As shown in FIG. 18, the third terminal includes a sending unit 1401, a receiving unit 1402, and a broadcast unit 1403.

The sending unit 1401 is configured to send a ninth message to a third ProSe entity, where the ninth message carries a terminal identifier of the third terminal and a group identifier of a group in which the third terminal is located.

The receiving unit 1402 is configured to receive a tenth message sent by the third ProSe entity, where the tenth message carries a first broadcast code word, and the first broadcast code word includes a group code word of the group in which the third terminal is located and a user code word of the third terminal.

The broadcast unit 1403 is configured to broadcast the first broadcast code word.

Optionally, the group identifier is a temporary identifier allocated by an application server to the group in which the third terminal is located, and the terminal identifier of the third terminal is a temporary identifier allocated by the application server to the third terminal.

It should be noted that for specific descriptions of some function modules in the third terminal provided in this embodiment of the present disclosure, refer to corresponding content in the method embodiments, and details are not described in this embodiment again.

According to the third terminal provided in this embodiment of the present disclosure, a first broadcast code word broadcasted by a third terminal includes a group code word of a group in which the third terminal is located and a user code word of the third terminal. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

Figure 19:
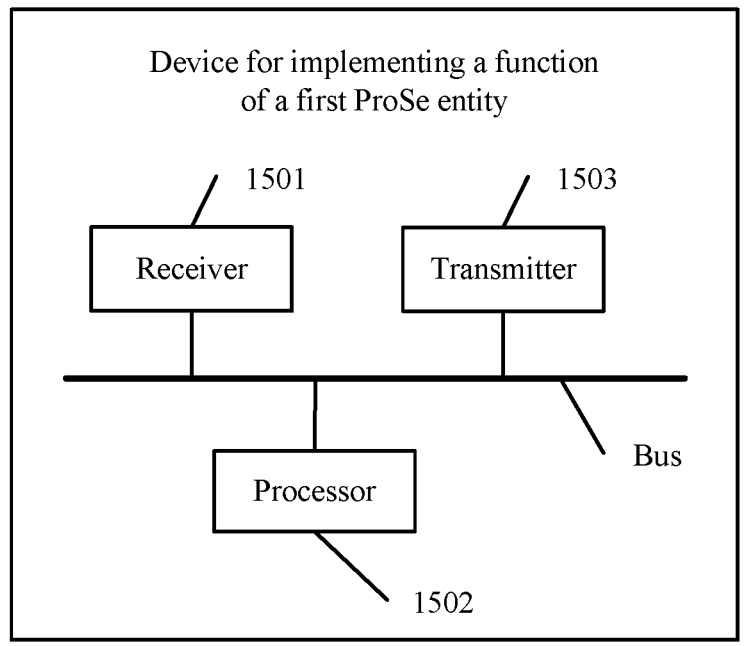
FIG. 19 is a schematic diagram of composition of another device for implementing a function of a first ProSe entity according to an embodiment of the present disclosure.

An embodiment of the present disclosure further provides a device for implementing a function of a first ProSe entity, configured to execute the terminal discovery methods shown in FIG. 1, FIG. 8, FIG. 9, and FIG. 10. As shown in FIG. 19, the device includes a receiver 1501, a processor 1502, and a transmitter 1503.

The receiver 1501 is configured to receive a first message sent by a first terminal, where the first message carries a group identifier of a group in which a terminal to be monitored by the first terminal is located.

The processor 1502 is configured to obtain, according to the group identifier, a group code word of the group in which the terminal to be monitored by the first terminal is located.

The transmitter 1503 is configured to send a second message to the first terminal, where the second message carries the group code word.

The receiver 1501 is further configured to receive a third message sent by the first terminal, where the third message carries at least one first broadcast code word, the first broadcast code word is a broadcast code word that is of broadcast code words detected by the first terminal and that includes the group code word, and the first broadcast code word further includes a user code word of a terminal that broadcasts the first broadcast code word.

The processor 1502 is further configured to obtain, according to the user code word, a terminal identifier of the terminal that broadcasts the first broadcast code word.

The transmitter 1503 is further configured to send a fourth message to the first terminal, where the fourth message carries the terminal identifier.

Further, in a first case, the transmitter 1503 is further configured to send a fifth message to an application server, where the fifth message carries the group identifier, and the fifth message is used to request the application server to allocate a code word to the group in which the terminal to be monitored by the first terminal is located.

The receiver 1501 is further configured to receive a sixth message sent by the application server, where the sixth message carries the group code word.

Further, in a second case, the processor 1502 is specifically configured to generate the group code word according to the group identifier.

Further, in a third case, the transmitter 1503 is further configured to send a seventh message to a second ProSe entity, where the seventh message carries the group identifier, the seventh message is used to request the second ProSe entity to allocate a code word to the group in which the terminal to be monitored by the first terminal is located, the second ProSe entity is a ProSe entity in an HPLMN of a second terminal, and the second terminal is a group management device of the group in which the terminal to be monitored by the first terminal is located.

The receiver 1501 is further configured to receive an eighth message sent by the second ProSe entity, where the eighth message carries the group code word.

Optionally, the group identifier is a temporary identifier allocated by an application server to the group in which the terminal to be monitored by the first terminal is located, and the terminal identifier is a temporary identifier allocated by the application server to the terminal that broadcasts the first broadcast code word.

The receiver 1501, the processor 1502, and the transmitter 1503 are interconnected and complete mutual communication by using a bus.

The processor 1502 may be a central processing unit (CPU), or may be a combination of the CPU and a digital signal processor (DSP).

The receiver 1501 and the transmitter 1503 may be apparatuses that receive and send a radio signal by using an antenna, or may be other apparatuses that provide signal receiving and sending interfaces.

It should be noted that for specific descriptions of some function modules in the device for implementing a function of a first ProSe entity provided in this embodiment of the present disclosure, refer to corresponding content in the method embodiments, and details are not described in this embodiment again. The device for implementing a function of a first ProSe entity provided in this embodiment of the present disclosure may be a new separate device in a core network, and provides only a function of a ProSe entity; or the device for implementing a function of a first ProSe entity may be obtained by adding a function of a first ProSe entity to an existing device in the core network, such as a mobility management entity (MME).

According to the device for implementing a function of a first ProSe entity provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Figure 20:
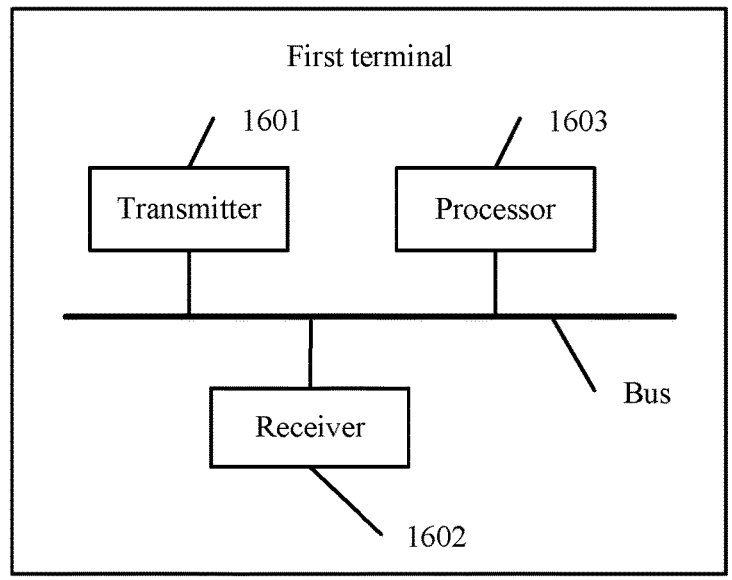
FIG. 20 is a schematic diagram of composition of another first terminal according to an embodiment of the present disclosure.

An embodiment of the present disclosure further provides a first terminal, configured to execute the terminal discovery methods shown in FIG. 2, FIG. 8, FIG. 9, and FIG. 10. As shown in FIG. 20, the first terminal includes a transmitter 1601, a receiver 1602, and a processor 1603.

The transmitter 1601 is configured to send a first message to a first ProSe entity, where the first message carries a group identifier of a group in which a terminal to be monitored by the first terminal is located.

The receiver 1602 is configured to receive a second message sent by the first ProSe entity, where the second message carries a group code word of the group in which the terminal to be monitored by the first terminal is located.

The processor 1603 is configured to filter, by using the group code word, broadcast code words detected by the first terminal, to obtain at least one first broadcast code word, where the first broadcast code word includes the group code word.

The transmitter 1601 is further configured to send a third message to the first ProSe entity, where the third message carries the at least one first broadcast code word.

The receiver 1602 is further configured to receive a fourth message sent by the first ProSe entity, where the fourth message carries a terminal identifier of a terminal that broadcasts the first broadcast code word.

Optionally, the group identifier is a temporary identifier allocated by an application server to the group in which the terminal to be monitored by the first terminal is located, and the terminal identifier is a temporary identifier allocated by the application server to the terminal that broadcasts the first broadcast code word.

The transmitter 1601, the receiver 1602, and the processor 1603 are interconnected and complete mutual communication by using a bus.

The processor 1603 may be a CPU, or may be a combination of the CPU and a DSP.

The transmitter 1601 and the receiver 1602 may be apparatuses that receive and send a radio signal by using an antenna, or may be other apparatuses that provide signal receiving and sending interfaces.

It should be noted that for specific descriptions of some function modules in the first terminal provided in this embodiment of the present disclosure, refer to corresponding content in the method embodiments, and details are not described in this embodiment again.

According to the first terminal provided in this embodiment of the present disclosure, because each first broadcast code word includes a group code word, when a first terminal needs to monitor multiple terminals of a group, the first terminal only needs to filter once, by using the group code word (the group code word is a part of a broadcast code word), broadcast code words detected by the first terminal, and does not need to separately filter once, by using broadcast code words (multiple broadcast code words) of the multiple terminals of the group, the broadcast code words detected by the first terminal. A process of filtering the broadcast code words is relatively simple, and therefore energy consumption of the first terminal may be reduced.

Figure 21:
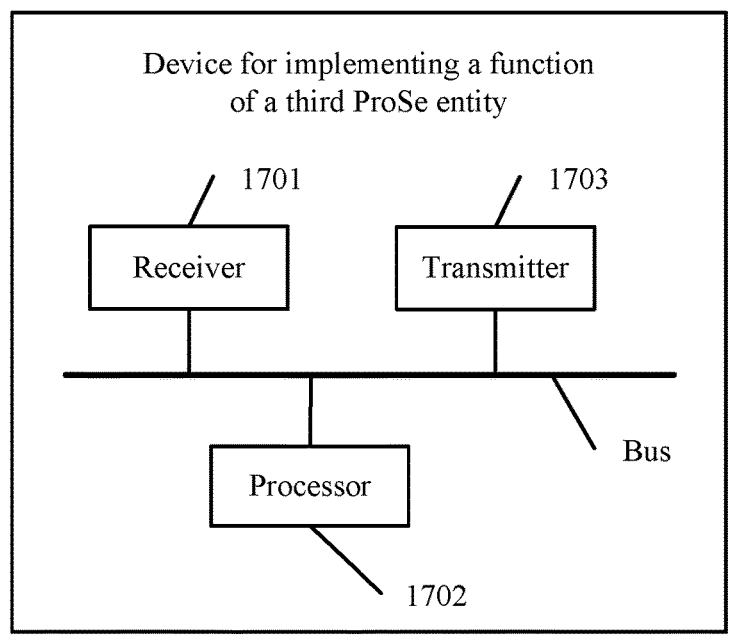
FIG. 21 is a schematic diagram of composition of another device for implementing a function of a third ProSe entity according to an embodiment of the present disclosure.

An embodiment of the present disclosure further provides a device for implementing a function of a third ProSe entity, configured to execute the terminal discovery methods shown in FIG. 3, FIG. 5, FIG. 6, and FIG. 7. As shown in FIG. 21, the device includes a receiver 1701, a processor 1702, and a transmitter 1703.

The receiver 1701 is configured to receive a ninth message sent by a third terminal, where the ninth message carries a terminal identifier of the third terminal and a group identifier of a group in which the third terminal is located.

The processor 1702 is configured to: obtain, according to the group identifier, a group code word of the group in which the third terminal is located, allocate a user code word to the third terminal according to the terminal identifier of the third terminal, and generate a first broadcast code word by using the group code word and the user code word.

The transmitter 1703 is configured to send a tenth message to the third terminal, where the tenth message carries the first broadcast code word, and the tenth message is used to instruct the third terminal to broadcast the first broadcast code word.

Further, in a first case, the transmitter 1703 is further configured to send an eleventh message to an application server, where the eleventh message carries the group identifier, and the eleventh message is used to request the application server to allocate a code word to the group in which the third terminal is located.

The receiver 1701 is further configured to receive a twelfth message sent by the application server, where the twelfth message carries the group code word.

Further, in a second case, the processor 1702 is specifically configured to generate the group code word according to the group identifier.

Further, in a third case, the transmitter 1703 is further configured to send a thirteenth message to a second ProSe entity, where the thirteenth message carries the group identifier, the thirteenth message is used to request the second ProSe entity to allocate a code word to the group in which the third terminal is located, the second ProSe entity is a ProSe entity in an HPLMN of a second terminal, and the second terminal is a group management device of the group in which the third terminal is located.

The receiver 1701 is further configured to receive a fourteenth message sent by the second ProSe entity, where the fourteenth message carries the group code word.

Optionally, the group identifier is a temporary identifier allocated by an application server to the group in which the third terminal is located, and the terminal identifier of the third terminal is a temporary identifier allocated by the application server to the third terminal.

The receiver 1701, the processor 1702, and the transmitter 1703 are interconnected and complete mutual communication by using a bus.

The processor 1702 may be a CPU, or may be a combination of the CPU and a DSP.

The receiver 1701 and the transmitter 1703 may be apparatuses that receive and send a radio signal by using an antenna, or may be other apparatuses that provide signal receiving and sending interfaces.

It should be noted that for specific descriptions of some function modules in the device for implementing a function of a third ProSe entity provided in this embodiment of the present disclosure, refer to corresponding content in the method embodiments, and details are not described in this embodiment again. The device for implementing a function of a third ProSe entity provided in this embodiment of the present disclosure may be a new separate device in a core network, and provides only a function of a ProSe entity; or the device for implementing a function of a third ProSe entity may be obtained by adding a function of a third ProSe entity to an existing device in the core network, such as a MME.

According to the device for implementing a function of a third ProSe entity provided in this embodiment of the present disclosure, a first broadcast code word allocated by a third ProSe entity to a third terminal includes a group code word. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

Figure 22:
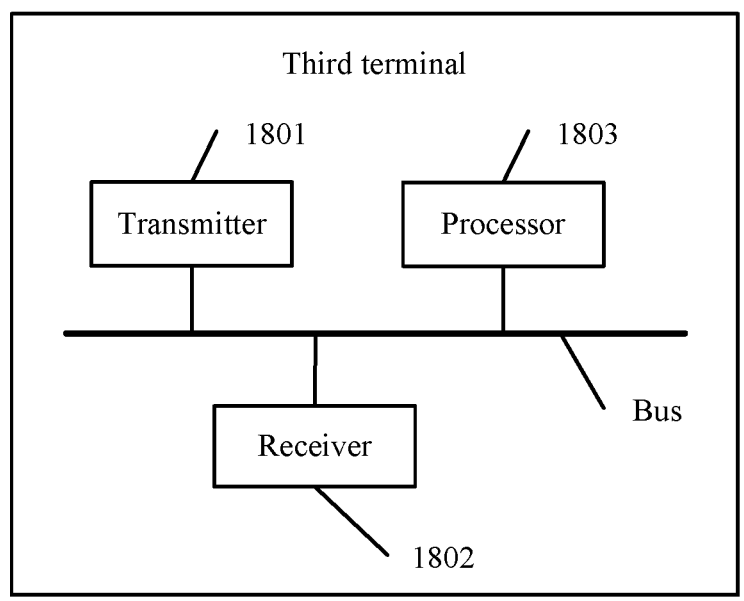
FIG. 22 is a schematic diagram of composition of another third terminal according to an embodiment of the present disclosure.

An embodiment of the present disclosure further provides a third terminal, configured to execute the terminal discovery shown in FIG. 4, FIG. 5, FIG. 6, and FIG. 7. As shown in FIG. 22, the third terminal includes a transmitter 1801, a receiver 1802, and a processor 1803.

The transmitter 1801 is configured to send a ninth message to a third ProSe entity, where the ninth message carries a terminal identifier of the third terminal and a group identifier of a group in which the third terminal is located.

The receiver 1802 is configured to receive a tenth message sent by the third ProSe entity, where the tenth message carries a first broadcast code word, and the first broadcast code word includes a group code word of the group in which the third terminal is located and a user code word of the third terminal.

The processor 1803 is configured to broadcast the first broadcast code word.

Optionally, the group identifier is a temporary identifier allocated by an application server to the group in which the third terminal is located, and the terminal identifier of the third terminal is a temporary identifier allocated by the application server to the third terminal.

The transmitter 1801, the receiver 1802, and the processor 1803 are interconnected and complete mutual communication by using a bus.

The processor 1803 may be a CPU, or may be a combination of the CPU and a DSP.

The transmitter 1801 and the receiver 1802 may be apparatuses that receive and send a radio signal by using an antenna, or may be other apparatuses that provide signal receiving and sending interfaces.

It should be noted that for specific descriptions of some function modules in the third terminal provided in this embodiment of the present disclosure, refer to corresponding content in the method embodiments, and details are not described in this embodiment again.

According to the third terminal provided in this embodiment of the present disclosure, a first broadcast code word broadcasted by a third terminal includes a group code word of a group in which the third terminal is located and a user code word of the third terminal. If a first terminal can detect the first broadcast code word broadcasted by the third terminal, the first terminal can obtain, by filtering and by using the group code word, the first broadcast code word broadcasted by the third terminal. When another terminal that is in a same group as the third terminal also performs broadcasting, a first broadcast code word broadcasted by the another terminal that is in the same group as the third terminal also includes the group code word. The first terminal can also obtain, by filtering and by using the group code word, the first broadcast code word broadcasted by the another terminal that is in the same group as the third terminal, and the first terminal does not need to separately filter once, by using multiple first broadcast code words, broadcast code words detected by the first terminal. A process of filtering the broadcast code words is relatively simple, and therefore energy consumption of the first terminal may be reduced.

The foregoing descriptions about implementations allow persons skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of the present disclosure. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present disclosure, but are not intended to limit the protection scope of the present disclosure. Any variation or replacement readily figured out by persons skilled in the art within the technical scope disclosed in the present disclosure shall fall within the protection scope of the present disclosure. Therefore, the protection scope of the present disclosure shall be subject to the protection scope of the claims.

What is claimed is:

1. A terminal discovery method, comprising:
receiving, by a first proximity service (ProSe) entity, a first message sent by a first terminal, wherein the first message carries a group identifier of a group in which a terminal to be monitored by the first terminal is located;
obtaining, by the first ProSe entity according to the group identifier, a group code word of the group in which the terminal to be monitored by the first terminal is located;
sending, by the first ProSe entity, a second message to the first terminal, wherein the second message carries the group code word;
receiving, by the first ProSe entity, a third message sent by the first terminal, wherein the third message carries at least one first broadcast code word, the first broadcast code word is a broadcast code word that is of broadcast code words detected by the first terminal and that comprises the group code word, and the first broadcast code word further comprises a user code word of a terminal that broadcasts the first broadcast code word; and
obtaining, by the first ProSe entity according to the user code word, a terminal identifier of the terminal that broadcasts the first broadcast code word, and sending a fourth message to the first terminal, wherein the fourth message carries the terminal identifier,
wherein the obtaining, by the first ProSe entity according to the group identifier, a group code word of the group in which the terminal to be monitored by the first terminal is located comprises:
sending, by the first ProSe entity, a fifth message to an application server, wherein the fifth message carries the group identifier, and the fifth message is used to request the application server to allocate a code word to the group in which the terminal to be monitored by the first terminal is located; and
receiving, by the first ProSe entity, a sixth message sent by the application server, wherein the sixth message carries the group code word.

2. The method according to claim 1, wherein the group identifier is a temporary identifier allocated by the application server to the group in which the terminal to be monitored by the first terminal is located, and the terminal identifier is a temporary identifier allocated by the application server to the terminal that broadcasts the first broadcast code word.

3. A device for implementing a function of a first proximity service (ProSe) entity, comprising:
a receiver, configured to receive a first message sent by a first terminal, wherein the first message carries a group identifier of a group in which a terminal to be monitored by the first terminal is located;
a processor, configured to obtain, according to the group identifier, a group code word of the group in which the terminal to be monitored by the first terminal is located; and
a transmitter, configured to send a second message to the first terminal, wherein the second message carries the group code word, wherein
the receiver is further configured to receive a third message sent by the first terminal, wherein the third message carries at least one first broadcast code word, the first broadcast code word is a broadcast code word that is of broadcast code words detected by the first terminal and that comprises the group code word, and the first broadcast code word further comprises a user code word of a terminal that broadcasts the first broadcast code word;
the processor is further configured to obtain, according to the user code word, a terminal identifier of the terminal that broadcasts the first broadcast code word; and
the transmitter is further configured to send a fourth message to the first terminal, wherein the fourth message carries the terminal identifier,
wherein the transmitter is further configured to send a seventh message to a second ProSe entity, wherein the seventh message carries the group identifier, the seventh message is used to request the second ProSe entity to allocate a code word to the group in which the terminal to be monitored by the first terminal is located, the second ProSe entity is a ProSe entity in a home public land mobile network (HPLMN) of a second terminal, and the second terminal is a group management device of the group in which the terminal to be monitored by the first terminal is located; and
wherein the receiver is further configured to receive an eighth message sent by the second ProSe entity, wherein the eighth message carries the group code word.

4. A terminal discovery method, comprising:
receiving, by a first proximity service (ProSe) entity, a first message sent by a first terminal, wherein the first message carries a group identifier of a group in which a terminal to be monitored by the first terminal is located;
obtaining, by the first ProSe entity according to the group identifier, a group code word of the group in which the terminal to be monitored by the first terminal is located;
sending, by the first ProSe entity, a second message to the first terminal, wherein the second message carries the group code word;
receiving, by the first ProSe entity, a third message sent by the first terminal, wherein the third message carries at least one first broadcast code word, the first broadcast code word is a broadcast code word that is of broadcast code words detected by the first terminal and that comprises the group code word, and the first broadcast code word further comprises a user code word of a terminal that broadcasts the first broadcast code word; and obtaining, by the first ProSe entity according to the user code word, a terminal identifier of the terminal that broadcasts the first broadcast code word, and sending a fourth message to the first terminal, wherein the fourth message carries the terminal identifier,
wherein when the first terminal and a second terminal belong to different home public land mobile networks (HPLMNs), and the second terminal is a group management device of the group in which the terminal to be monitored by the first terminal is located, the obtaining, by the first ProSe entity according to the group identifier, a group code word of the group in which the terminal to be monitored by the first terminal is located comprises:
sending, by the first ProSe entity, a seventh message to a second ProSe entity, wherein the seventh message carries the group identifier, the seventh message is used to request the second ProSe entity to allocate a code word to the group in which the terminal to be monitored by the first terminal is located, and the second ProSe entity is a ProSe entity in an HPLMN of the second terminal; and
receiving, by the first ProSe entity, an eighth message sent by the second ProSe entity, wherein the eighth message carries the group code word.

5. A device for implementing a function of a first proximity service (ProSe) entity, comprising:
a receiver, configured to receive a first message sent by a first terminal, wherein the first message carries a group identifier of a group in which a terminal to be monitored by the first terminal is located;
a processor, configured to obtain, according to the group identifier, a group code word of the group in which the terminal to be monitored by the first terminal is located; and
a transmitter, configured to send a second message to the first terminal, wherein the second message carries the group code word, wherein
the receiver is further configured to receive a third message sent by the first terminal, wherein the third message carries at least one first broadcast code word, the first broadcast code word is a broadcast code word that is of broadcast code words detected by the first terminal and that comprises the group code word, and the first broadcast code word further comprises a user code word of a terminal that broadcasts the first broadcast code word;
the processor is further configured to obtain, according to the user code word, a terminal identifier of the terminal that broadcasts the first broadcast code word; and
the transmitter is further configured to send a fourth message to the first terminal, wherein the fourth message carries the terminal identifier,
wherein the transmitter is further configured to send a fifth message to an application server, wherein the fifth message carries the group identifier, and the fifth message is used to request the application server to allocate a code word to the group in which the terminal to be monitored by the first terminal is located; and
wherein the receiver is further configured to receive a sixth message sent by the application server, wherein the sixth message carries the group code word.

6. The device according to claim 5, wherein the group identifier is a temporary identifier allocated by the application server to the group in which the terminal to be monitored by the first terminal is located, and the terminal identifier is a temporary identifier allocated by the application server to the terminal that broadcasts the first broadcast code word.

* * * * *